(12) United States Patent
Matsui et al.

(10) Patent No.: US 7,568,996 B2
(45) Date of Patent: Aug. 4, 2009

(54) SPEED-RATIO CONTROL APPARATUS FOR VEHICULAR CONTINUOUSLY VARIABLE TRANSMISSION

(75) Inventors: Yasunari Matsui, Okazaki (JP); Tadashi Tamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 444 days.

(21) Appl. No.: 11/548,096

(22) Filed: Oct. 10, 2006

(65) Prior Publication Data
US 2007/0099753 A1 May 3, 2007

(30) Foreign Application Priority Data
Oct. 31, 2005 (JP) .............................. 2005-317478

(51) Int. Cl.
*F16H 61/662* (2006.01)
*B60W 10/06* (2006.01)
*B60W 10/10* (2006.01)
(52) U.S. Cl. ...................................................... 477/46
(58) Field of Classification Search ........................ None
See application file for complete search history.

(56) References Cited

U.S. PATENT DOCUMENTS

| 5,131,297 A | 7/1992 | Yamashita et al. |
| 5,749,804 A | 5/1998 | Toukura |
| 6,345,221 B2 | 2/2002 | Hattori et al. |

| 2004/0172184 A1* | 9/2004 | Vukovich et al. .............. 701/51 |

FOREIGN PATENT DOCUMENTS

| DE | 196 43 161 A1 | 4/1997 |
| DE | 101 03 133 B4 | 6/2006 |
| DE | 41 06 471 B4 | 8/2006 |
| JP | 2001-330143 | 11/2001 |

* cited by examiner

Primary Examiner—Sherry L Estremsky
Assistant Examiner—Erin D Bishop
(74) Attorney, Agent, or Firm—Oblon, Spivak, McClelland, Maier & Neustadt, P.C.

(57) ABSTRACT

A speed-ratio control apparatus for controlling a speed ratio of a continuously variable transmission of a vehicle, such that an actual input speed of the transmission coincides with a target input speed, the apparatus including an acceleration-requirement determining portion operable to determine whether non-rapid acceleration or rapid acceleration of the vehicle is required by a vehicle operator, and a target-input-speed setting portion operable, upon determination of the operator's requirement for the non-rapid acceleration, to implement an instantaneous stepping increase of the target input speed to a first transient target value, (ii) hold the target input speed at the first transient target value in a first portion of a rapid shifting period, (iii) instantaneously reduce, at the end of the first portion of the rapid shifting period, the target input speed to an initial value of a second transient target value which initial value is close to the actual input speed and lower than the first transient target value, and (iv) gradually increase, in a second portion of the rapid shifting period, the target input speed back toward the first transient value, and upon determination of the operator's requirement for the rapid acceleration, the target-input-speed setting portion holding the target input speed at the first transient target input speed during the rapid shifting period, without setting at the second transient target value.

10 Claims, 10 Drawing Sheets

SPEED-RATIO CONTROL APPARATUS FOR VEHICULAR CONTINUOUSLY VARIABLE TRANSMISSION

This application is based on Japanese Patent Application No. 2005-317478 filed Oct. 31, 2005, the contents of which are incorporated hereinto by reference.

BACKGROUND OF THE INVENTION

1. Field of the Invention

The present invention relates in general to a speed-ratio control apparatus arranged to control a speed ratio of a vehicular continuously variable transmission such that an actual value of an input speed of the transmission coincide with a target value of the input speed, and more particularly to setting of the target input speed value upon requirement for acceleration of a vehicle.

2. Discussion of Related Art

For a continuously variable transmission provided on a motor vehicle, there is known a speed-ratio control apparatus arranged to control the speed ratio of the continuously variable transmission such that an actual value of the input speed of the transmission coincides with a target value of the input speed, which is set on the basis of a running condition of the vehicle as represented by its running speed and an operating amount of an accelerator pedal.

JP-2001-330143A discloses an example of such a speed-ratio control apparatus for a vehicular continuously variable transmission. This speed-ratio control apparatus is arranged to set a transient target value of the input speed of the transmission, so as to change along a curve of a first-order time lag, during a normal running of the vehicle, and to feedback-control the speed ratio of the continuously variable transmission such that the actual input speed first coincides with the transient target value, and eventually coincides with a final target value, so that the speed ratio of the transmission is changed at a shifting rate that does not cause a shifting shock or a delayed shifting of the transmission. Upon requirement for rapid acceleration of the vehicle with a relatively large amount of operation of the accelerator pedal, on the other hand, the speed ratio-control apparatus implements, during a rapid shifting period, a stepping increase of the transient target input speed to a value lower than the final target value, so that the speed ratio of the transmission is changed at a relatively high rate to meet the vehicle operator's requirement for rapidly accelerating the vehicle. During a constant-rate shifting period which follows the rapid shifting period during which a difference between the actual and transient target input speeds has been reduced to a certain amount by the feedback control of the speed ratio of the transmission, the speed-ratio control apparatus gradually increases, for example, linearly increases the transient target input speed toward the final target value, for thereby further reducing the above-indicated input speed difference, so that the speed ratio is changed at a relatively low rate, to prevent the shifting shock at the end of the shifting action. The speed ratio of the continuously variable transmission is feedback-controlled such that the actual input speed initially coincides with the thus set transient target value, and then with the final target value.

The stepping increase of the transient target value of the input speed upon requirement for rapid acceleration of the vehicle with a rapid depression of the accelerator pedal by a large amount for running the vehicle with a high degree of drivability results in rapid acceleration of the vehicle, which meets the vehicle operator's desire for powerful driving of the vehicle. Where the acceleration value of the vehicle as desired by the vehicle operator is not so high, the stepping increase of the transient target input speed which results in the rapid acceleration of the vehicle unfavorably has a risk of deterioration of driving comfort as felt by the vehicle operator.

SUMMARY OF THE INVENTION

The present invention was made in view of the background art discussed above. It is therefore an object of the present invention to provide a speed-ratio control apparatus for a vehicular continuously variable transmission the speed ratio of which is controlled such that the actual input speed of the transmission coincides with a target value set on the basis of the running condition of the vehicle, which speed-ratio control apparatus is arranged to adequately set the transient target value of the input speed upon requirement for acceleration of the vehicle with an operation of a vehicle accelerating member, so that the set transient target value adequately reflects the requirement by the vehicle operator for acceleration of the vehicle.

The object indicated above may be achieved according to the principle of this invention, which provides a continuously variable transmission disposed in a power transmitting path between a drive power source and a drive wheel of a vehicle, such that an actual input speed of the continuously variable transmission coincides with a target input speed set on the basis of a running condition of the vehicle, the speed-ratio control apparatus comprising: (a) an acceleration-requirement determining portion operable, on the basis of an operation of a vehicle accelerating member, to determine whether non-rapid acceleration of the vehicle is required by an operator of the vehicle, and whether rapid acceleration of the vehicle is required by the operator, and (b) a target-input-speed setting portion operable, upon determination by the acceleration-requirement determining portion that the non-rapid acceleration of the vehicle is required by the operator, to (i) implement an instantaneous stepping increase of the target input speed to a first transient target input speed which is higher than the actual input speed, (ii) hold the target input speed at the first transient target input speed in a first portion of a rapid shifting period, (iii) instantaneously reduce, at the end of the first portion of the rapid shifting period, the target input speed to an initial value of a second transient target input speed which initial value is close to the actual input speed and lower than the first transient target input speed, and (iv) gradually increase, in a second portion of the rapid shifting period following the first portion, the target input speed back toward the first transient target input speed, and upon determination by the acceleration-requirement determining portion that the rapid acceleration of the vehicle is required by the operator, the target-input-speed setting portion holding the target input speed at the first transient target input speed during the rapid shifting period, without setting at the second transient target input speed.

In the speed-ratio control apparatus of the present invention described above, the target-input-speed setting portion implements an instantaneous stepping increase of the target input speed to the first transient target value and holds the transient target input speed at the first transient target value, in the first portion of the rapid shifting period, when the acceleration-requirement determining portion has determined, on the basis of the operating amount of the vehicle accelerating member, that the non-rapid (normal) acceleration (not the rapid acceleration) of the vehicle is required by the vehicle operator. At the end of the first portion of the rapid shifting period, the target-input-speed setting portion instantaneously reduces the transient target input speed down to an initial value of a second transient target input speed, which initial value is close to the actual input speed and lower than the first transient target input speed. In the second portion of the rapid shifting period following the first portion, the target-input-speed setting portion gradually increases the second transient target input speed back toward the first transient target input speed. Accordingly, the speed ratio of the continuously variable transmission is initially changed at a comparatively high rate in the first portion of the rapid shifting period, for relatively rapid acceleration of the vehicle according to the operation of the vehicle accelerating member, and subsequently changed at a comparatively low rate in the second portion of the rapid shifting period, for relatively slow acceleration of the vehicle, so that the vehicle is accelerated at an adequately controlled rate during the control of the speed ratio, whereby the vehicle operator's desire regarding the acceleration of the vehicle is adequately reflected on the rate of change of the speed ratio γ. When the acceleration-requirement determining portion has determined that the rapid acceleration of the vehicle is required by the vehicle operator, on the other hand, the target-input-speed setting portion holds the target input speed at the first transient target input speed during the entire rapid shifting period, without setting at the second transient target value, so that the speed ratio of the continuously variable transmission is changed during the entire rapid shifting period, at a high rate for rapid acceleration of the vehicle according to a rapid operation of the vehicle accelerating member, whereby the vehicle operator's desire for rapid acceleration of the vehicle is adequately reflected on the rate of change of the speed ratio. Thus, the transient target input speed is set differently depending upon whether the non-rapid acceleration or rapid acceleration of the vehicle is required by the vehicle operator, so that the speed ratio of the continuously variable transmission is controlled at a rate according to the vehicle operator's desire regarding the vehicle acceleration.

According to a first preferred form of the speed-ratio control apparatus of this invention, the target-input-speed setting portion gradually increases the second transient target input speed toward the first transient target input speed along a curve of a first-order time lag. In this form of this invention, the second transient target input speed which is initially close to the actual input shaft speed is gradually increased back toward the first transient target value along the curve of the first-order time lag, so that the speed ratio of the continuously variable transmission is changed at a relatively low rate suitable for relatively slow acceleration of the vehicle while preventing a shifting shock or a delayed shifting of the continuously variable transmission, in the second portion of the rapid shifting period following the first portion in which the speed ratio is changed at a relatively high rate.

In one advantageous arrangement of the above-described first preferred form of the invention, the second transient target input speed $N_{IN}^{*}{}_{P2}$ defined by the curve of the first-order time lag is represented by an equation $N_{IN}^{*}{}_{P2}(t)=1-e^{-t/T}$, wherein "T" is a time constant which decreases with an increase of a rate of increase of an amount of operation of said vehicle accelerating member. In this arrangement, the rate of change of the speed ratio of the continuously variable transmission in the second portion of the rapid shifting period increases with an increase of the degree of requirement for acceleration of the vehicle as a result of an operation of the vehicle accelerating member by the vehicle operator, so that the vehicle operator's requirement regarding the vehicle acceleration can be more adequately reflected on the rate of change of the speed ratio of the continuously variable transmission.

According to a second preferred form of this invention, the target-input-speed setting portion determines the first transient target input speed on the basis of an amount of operation of the vehicle accelerating member and a running speed of the vehicle. In the present form of the invention, the vehicle operator's desire regarding the vehicle acceleration can be more adequately reflected on the rate of change of the speed ratio of the continuously variable transmission.

According to a third preferred form of this invention, a length of the first portion of the rapid shifting period is determined on the basis of a rate of increase of an amount of operation of the vehicle accelerating member. In this form of the invention, the vehicle operator's desire regarding the vehicle acceleration can be more adequately reflected on the rate of change of the speed ratio of the continuously variable transmission.

According to a fourth preferred form of this invention, the acceleration-requirement determining portion determines a requirement for the non-rapid acceleration of the vehicle and a requirement for the rapid acceleration of the vehicle, on the basis of at least one of: an amount of operation of an accelerator pedal provided as the vehicle accelerating member; an angle of opening of a throttle valve provided for the drive power source and controlled by the vehicle accelerating member; a rate of change of the amount of operation of the accelerator pedal; a rate of change of the angle of opening of the throttle valve; an amount of injection of a fuel into an intake pipe or cylinders of an engine provided as the drive power source: a quantity of intake air introduced into the intake pipe; and any other parameter indicative of a degree of requirement for acceleration of the vehicle.

According to a fifth preferred form of this invention, the continuously variable transmission is a belt-and-pulley type continuously variable transmission including a pair of variable-diameter pulleys effective widths of which are variable, and a transmission belt connecting the pair of variable-diameter pulleys. Alternatively, the continuously-variable transmission is a traction type continuously variable transmission including a pair of cones rotatable about a common axis, and a plurality of rollers each of which is rotatable about an axis intersecting the common axis and which are interposed between and in pressing contact with the pair of cones, and wherein the speed ratio of the continuously variable transmission is variable by changing an angle of intersection between the common axis and the axis of rotation of each roller.

According to a sixth preferred form of this invention, the drive power source includes an internal combustion engine such as a gasoline engine and a diesel engine. The drive power source may further includes an auxiliary drive source such as an electric motor or electric motors. Alternatively, the drive power source consists of an electric motor or electric motors only.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENTS

The preferred embodiments of this invention will be described in detail, by reference to the accompanying drawings.

Figure 1:
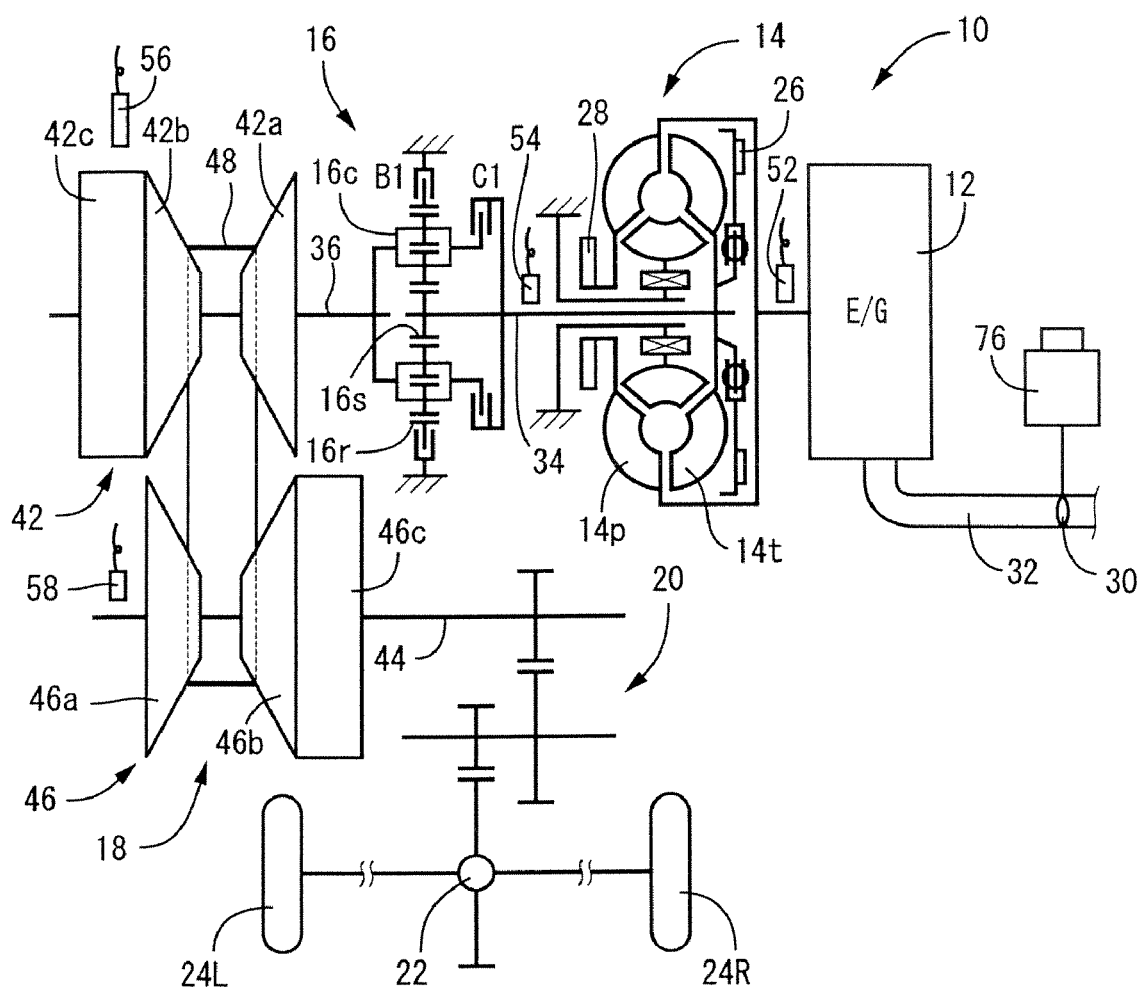
FIG. 1 is a schematic view illustrating a vehicular drive system including a continuously variable transmission controlled by a speed-ratio control apparatus constructed according to one embodiment of the present invention.

Referring first to the schematic view of FIG. 1, there is illustrated a vehicular drive system 10 including a continuously variable transmission (CVT) 18 of a belt-and-pulley type which is controlled by a speed-ratio control apparatus constructed according to one embodiment of this invention. The vehicular drive system 10 is of a transversely installed type suitably used on an FF vehicle (front-engine front-drive vehicle), and includes a drive power source in the form of an internal combustion engine 12. An output of the engine 12 is transmitted to right and left drive wheels 24R, 24L of a motor vehicle through a crankshaft of the engine 12, a fluid-operated power transmitting device in the form of a torque converter 14, a forward/reverse switching device 16, the above-indicated continuously variable transmission 18, a reduction gear device 20 and a differential gear device 22.

The torque converter 14 includes a pump impeller 14p connected to the crankshaft of the engine 12, and a turbine impeller 14t connected to the forward/reverse switching device 16 through a turbine shaft 34, which functions as an output member of the torque converter 14. Between the pump impeller 14p and the turbine impeller 14t, there is disposed a lock-up clutch 26 having an engaging hydraulic chamber and a releasing hydraulic chamber. This lock-up clutch 26 is selectively engaged or released by controlling flows of a pressurized working fluid to and from the engaging and releasing hydraulic chambers through a switching valve device (not shown) incorporated in a hydraulic control unit 100 shown in FIGS. 2 and 3. When the lock-up clutch 26 is placed in its fully engaged state, the pump impeller 14p and the turbine impeller 14t are rotated as a unit. The pressurizing working fluid for engaging and releasing the lock-up clutch is generated by a mechanical oil pump 28, which is also used for controlling shifting actions and a belt tension of the continuously variable transmission 18, and for supplying the working fluid as a lubricant to various parts of the vehicular drive system 10.

The forward/reverse switching device 16 is constituted principally by a planetary gear set of a double-pinion type including a sun gear 16s integrally fixed to the turbine shaft 34 of the torque converter 14, a carrier 16c integrally fixed to an input shaft 36 of the continuously variable transmission 18, and a ring gear 16r selectively fixed to its housing through a reverse-drive brake B1. The carrier 16c and the sun gear 16s are selectively connected to each other through a forward drive clutch C1. The forward-drive clutch C1 and the reverse-drive brake B1, cooperate to function as a disconnecting device, are hydraulically operated frictional coupling devices which are frictionally engaged and released by hydraulic actuators.

When the forward-drive clutch C1 is placed in its engaged state while the reverse-drive clutch B1 is placed in its released state, the rotary elements of the forward/reverse switching device 16 are rotated as a unit, and the turbine shaft 34 is connected directly to the input shaft 36, so that the forward/reverse switching device 16 is placed in its forward drive state for transmitting a forward vehicle drive force to the continuously variable transmission 18. When the reverse-drive brake B1 is placed in its engaged state while the forward-drive clutch C1 is placed in its released state, the forward/reverse switching device 16 is placed in its reverse drive state in which the input shaft 36 is rotated in a direction opposite to the direction of rotation of the turbine shaft 34, whereby a reverse vehicle drive force is transmitted to the continuously variable transmission 18. When the forward-drive clutch C1 and the reverse-drive brake B1 are both placed in their released state, the forward/reverse switching device 16 is placed in its neutral state in which a vehicle drive force is not transmitted to the continuously variable transmission 18.

The continuously variable transmission 18 includes an input-side member in the form of a variable-diameter input pulley (primary sheave) 42 mounted on its input shaft 36 and having a variable diameter, an output-side member in the form of a variable-diameter output pulley (secondary sheave) 46 mounted on its output shaft 44 and having a variable diameter, and a transmission belt 48 connecting those input and output pulleys 42, 46. A drive force is transmitted from the input pulley 42 to the output pulley 44 through the transmission belt 48 held in a frictional contact with the input and output pulleys 42, 46.

The variable-diameter input and output pulleys 42, 46 respectively include stationary rotary members 42a, 46a fixedly mounted on the respective input and output shafts 36, 44, movable rotary members 42b, 46b axially slidably and non-rotatably mounted on the respective input and output shafts 36, 44, and input-side and output-side hydraulic cylinders 42c, 46c each operable to change the width of a V-groove defined by and between the stationary and movable rotary members 42a and 42b, or 46a and 46b. A hydraulic pressure (speed-ratio control pressure $P_{RATIO}$) of the input-side hydraulic cylinder 42c is controlled by the hydraulic control unit 100, for thereby changing the widths of the V grooves of the two variable diameter-pulleys 42, 46, to change the effective diameter of the transmission belt 48, so that a speed ratio γ of the continuously variable transmission 18 (=speed $N_{IN}$ of the input shaft 36/speed $N_{OUT}$ of the output shaft 44) is continuously variable. A hydraulic pressure (belt-tension control pressure $P_{BELT}$) of the output-side hydraulic cylinder 46c is also controlled by the hydraulic control unit 100, for thereby controlling a tension of the transmission belt 48 so as to prevent slipping of the transmission belt 48.

Figure 2:
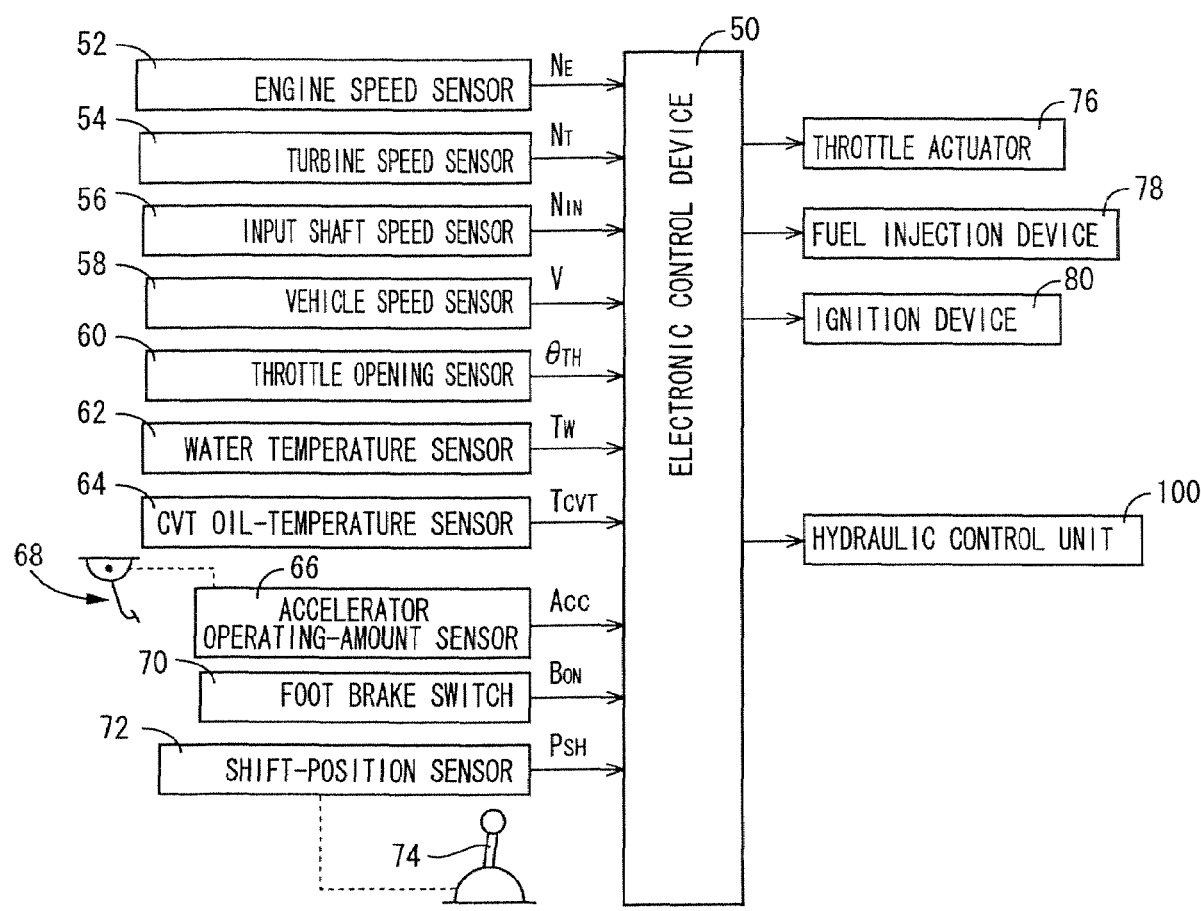
FIG. 2 is a block diagram showing major elements of an electric control system for controlling the vehicle drive system.

Referring next to the block diagram of FIG. 2, there are shown major elements of an electric control system for controlling the vehicle drive system 10. The electric control system includes an electronic control device 50 which is constituted principally by a microcomputer incorporating a CPU (central processing unit), a RAM (random-access memory), a ROM (read-only memory), and an input-output interface. The CPU operates to perform signal processing operations according to a control program stored in the ROM, while utilizing a temporary data storage function of the RAM, for controlling the output of the engine 12, the shifting actions and belt tension of the continuously variable transmission 18, and the torque capacity of the lock-up clutch 26, for example. The electronic control device 50 may include separate control portions for controlling the engine 12, continuously variable transmission 18, lock-up clutch 26, etc., as needed.

The electronic control device 50 is arranged to receive various signals such as: an output signal of an engine speed sensor 52 indicative of an angular position $A_{CR}(°)$ and a rotating speed of the crankshaft of the engine 12, which correspond to an operating speed (engine speed) $N_E$ of the engine 12; an output signal of a turbine speed sensor 54 indicative of a rotating speed (turbine speed) $N_T$ of the turbine shaft 34; an output signal of an input shaft speed sensor 56 indicative of a rotating speed (input shaft speed) $N_{IN}$ of the input shaft 36 of the continuously variable transmission 18; an output signal of a vehicle speed sensor 58 indicative of a rotating speed (output shaft speed) $N_{OUT}$ of the output shaft 44 of the continuously variable transmission 18, from which a running speed V of the vehicle can be obtained; an output signal of a throttle opening sensor 60 indicative of an opening angle $\theta_{TH}$ of an electronic throttle valve 30 provided in an intake pipe 32 of the engine 12; an output signal of a water temperature sensor 64 indicative of a temperature $T_W$ of a cooling water of the engine 12; an output signal of a CVT oil-temperature sensor 64 indicative of a temperature $T_{CVT}$ of the working fluid in hydraulic circuits for the continuously variable transmission 18, etc.; an output signal of an accelerator operating-amount sensor 66 indicative of an operating amount $A_{CC}$ of a vehicle accelerating member in the form of an accelerator pedal 68; an output signal of a foot brake switch 70 indicative of an operated state $B_{ON}$ of a foot brake pedal for operating a service brake system of the vehicle; and an output signal of a shift-position sensor 72 indicative of a selected position $P_S$ of a shift lever 74.

The electronic control device 50 is arranged to generate various signals such as: a drive signal for driving a throttle actuator 76 to open and close the electronic throttle valve 30 according to the operating amount $A_{CC}$ of the accelerator pedal 68 (hereinafter referred to as "accelerator operating amount $A_{CC}$"), for controlling the output of the engine 12; a fuel injection signal for controlling an amount of injection of a fuel from a fuel injection device 78; an ignition timing control signal for controlling an ignition timing of an ignition device 78; various command signals to be applied to the hydraulic control unit 100, such as command signals to be applied to on-off solenoid valves DS1 and DS2 for controlling the speed-ratio control pressure $P_{RATIO}$ to change the speed ratio γ of the continuously variable transmission 18, a command signal to be applied to a linear solenoid valve SLT operable to receive a line pressure PL to control the belt-tension control pressure $P_{BELT}$ for adjusting the tension of the transmission belt 48, and a command signal to be applied to a linear solenoid valve (not shown) for the engaging, releasing and slipping actions of the lock-up clutch 26 to adjust the torque capacity of the lock-up clutch 26.

The line pressure PL is adjusted by a regulator valve of a pressure-relief type (not shown) in the hydraulic control unit 100, by controlling the hydraulic pressure generated by the mechanical type oil pump 28 operated by the engine 28. The line pressure PL is adjusted to a value according to a load acting on the engine 12, which is represented by the accelerator operating amount $A_{CC}$ or opening angle $\theta_{TH}$ of the electronic throttle valve 30.

The vehicle is provided with a shift lever 74 (shown in FIGS. 2 and 3) which is located adjacent to an operator's seat and which is manually operable to a selected one of five operating positions "P", "R", "N", "D" and "L".

The position "P" is a parking position in which the vehicular drive system 10 is placed in its neutral state for shutting off its power transmitting path and in which a rotary motion of the output shaft 44 is mechanically prevented by a suitable parking mechanism. The position "R" is a reverse-drive position in which the output shaft 44 is rotated in the reverse direction for reverse running of the vehicle, and the position "N" is a neutral position in which the vehicular drive system 10 is placed in its neutral position. The position "D" is a forward-drive position in which the output shaft 44 is rotated in the forward direction for forward running of the vehicle, with the continuously variable transmission 18 placed in its automatically shiftable state, and the position "L" is an engine-braking position for forward running of the vehicle, in which an engine brake is applicable to the vehicle.

Figure 3:
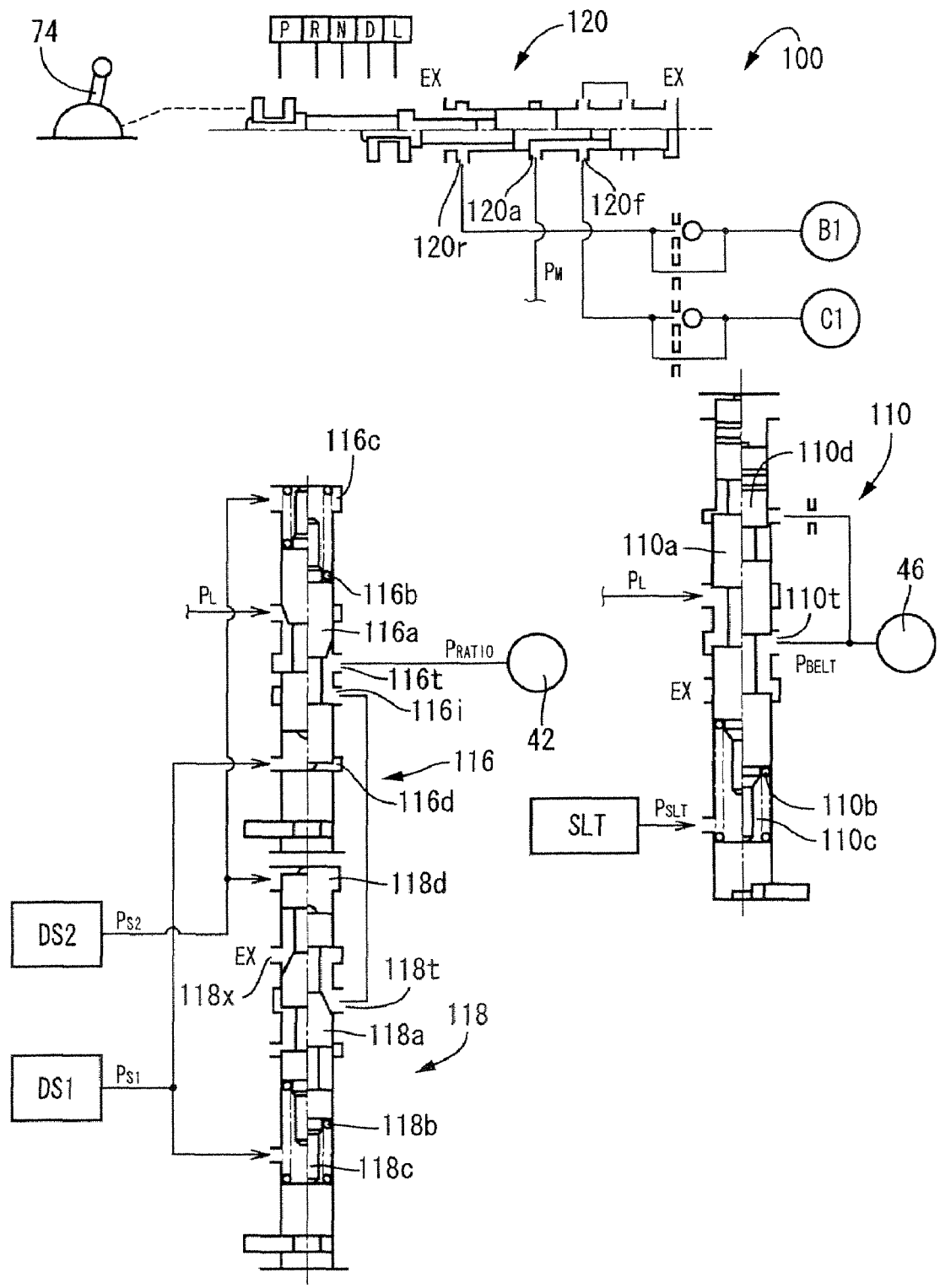
FIG. 3 is a hydraulic circuit diagram illustrating major portions of a hydraulic control unit arranged to control a belt tension of the continuously variable transmission, a speed ratio of the transmission, and hydraulic pressures to be applied to a forward-drive clutch and a reverse-drive brake which are selectively engaged according to an operation of a shift lever.

Referring to the hydraulic circuit diagram of FIG. 3, there are illustrated major portions of the hydraulic control unit 100 arranged to control the belt tension and speed ratio γ of the continuously variable transmission 18, and the hydraulic pressures to be applied to the forward-drive clutch C1 and the reverse-drive brake B1 according to the selected position of the shift lever 74. The hydraulic control unit 100 includes a belt-tension control valve 110 operable to control the hydraulic pressure of the output-side hydraulic cylinder 46c, that is, the belt-tension control pressure $P_{BELT}$ so as to prevent slipping of the transmission belt 48, a speed-ratio increasing valve 116 and a speed-ratio reducing valve 118 operable to control the hydraulic pressure of the input-side hydraulic cylinder 42c, that is, the speed-ratio control pressure $P_{RATIO}$ so as to continuously change the speed ratio γ of the continuously variable transmission 18, and a manual valve 120 operable to mechanically switch a hydraulic circuit for selectively engaging and releasing the forward-drive clutch C1 and the reverse-drive brake B1.

The manual valve 120 has an input port 120a which receives a modulator pressure $P_M$ generated by a modulator valve (not shown) on the basis of the line pressure PL. Namely, the modulator valve is operable to generate the working fluid having the modulator pressure $P_M$.

The manual valve 120 further has a forward-drive output port 120f, a reverse-drive output port 120r, and a drain port EX. When the shift lever 74 is operated to the position "D" or "L", the manual valve 120 is operated to a position in which the modulator pressure $P_M$ is applied, as a forward-drive output pressure, to the forward-drive clutch C1 through the forward-drive output port 120f while the working fluid is discharged from the reverse-drive brake B1 through the reverse-drive output port 120r and the drain port EX to a reservoir exposed to the atmospheric pressure, for example, so that the forward-drive clutch C1 is engaged while the reverse-drive brake B1 is released.

When the shift lever 74 is operated to the position "R", the manual vale 120 is operated to a position in which the modulator pressure PM is applied, as a reverse-drive output pressure, to the reverse-drive brake B1 through the reverse-drive output port 120r while the working fluid is discharged from the forward-drive clutch C1 through the forward-drive output port 120f and the drain port EX to the reservoir, so that the reverse-drive clutch B1 is engaged while the forward-drive clutch C1 is engaged.

When the shift lever 74 is operated to the position "P" or "N", the manual valve 120 is operated to a position in which a fluid passage connecting the input port 120a and the forward-drive output port 120f, and a fluid passage connecting the input port 120a and the reverse-drive output port 120r are both closed or shut-off, and the working fluid is discharged from the forward-drive clutch C1 and the reverse-drive brake B1, so that the forward-drive clutch C1 and the reverse-drive brake B1 are both released.

The speed-ratio increasing valve 116 has an input-output port 116t and an input-output port 116i, and includes a spool 116a axially movable to open and close those input-output ports 116t, 116i, and biasing means in the form of a spring 116b biasing the spool 116a in a direction for communication between the two input-output ports 116t, 116i. The speed-ratio increasing valve 116 further has an oil chamber 116c which accommodates the spring 116b and which receives an output pressure in the form of a control pressure $P_{S2}$ Of the on-off solenoid valve DS2 the duty ratio of which is controlled by the electronic control device 50, to generate a thrust force acting on the spool 116a in the direction for communication between the two input-output port 116t, 116i. The speed-ratio increasing valve 116 further has an oil chamber 116d which receives an output pressure in the form of a control pressure $P_{S1}$ of the on-off solenoid valve DS1 the duty ratio of which is controlled by the electronic control device 50, to generate a thrust force acting on the spool 116a in a direction for closing the input-output port 116i.

The speed-ratio reducing valve 118 has an input-output port 118t, and includes a spool 118a axially movable to open and close the input-output port 118t, and biasing means in the form of a spring 118b biasing the spool 118a in a direction for closing the input-output port 118t. The speed-ratio reducing valve 118 further has an oil chamber 118c which accommodates the spring 118b and which receives the control pressure $P_{S1}$ of the on-off solenoid valve DS1 the duty ratio of which is controlled by the electronic control device 50, to apply a thrust force acting on the spool 118a in the direction for closing the input-output port 118t, and an oil chamber 118d which receives the control pressure Psi of the on-off solenoid valve DS1 the duty ratio of which is controlled by the electronic control device 50, to apply a thrust force acting on the spool 118a in a direction for opening the input-output port 118t. The speed-ratio reducing valve 118 further has a discharge port 118x.

The on-off solenoid valve DS1 is arranged to generate the control pressure $P_{S1}$ for the speed-ratio increasing valve 116 to generate the speed-ratio control pressure $P_{RATIO}$ to be applied to the input-side hydraulic cylinder 42c, for reducing the width of the V-groove of the variable-diameter input pulley 42 to reduce the speed ratio γ of the continuously variable transmission 18. The on-off solenoid valve DS2 is arranged to generate the control pressure $P_{S2}$ for the speed-ratio increasing valve 116 to generate the speed-ratio control pressure $P_{RATIO}$ to be applied to the input-side hydraulic cylinder 42c, for increasing the width of the V-groove of the variable-diameter input pulley 42 to increase the speed ratio γ of the continuously variable transmission 18.

Figure 4:
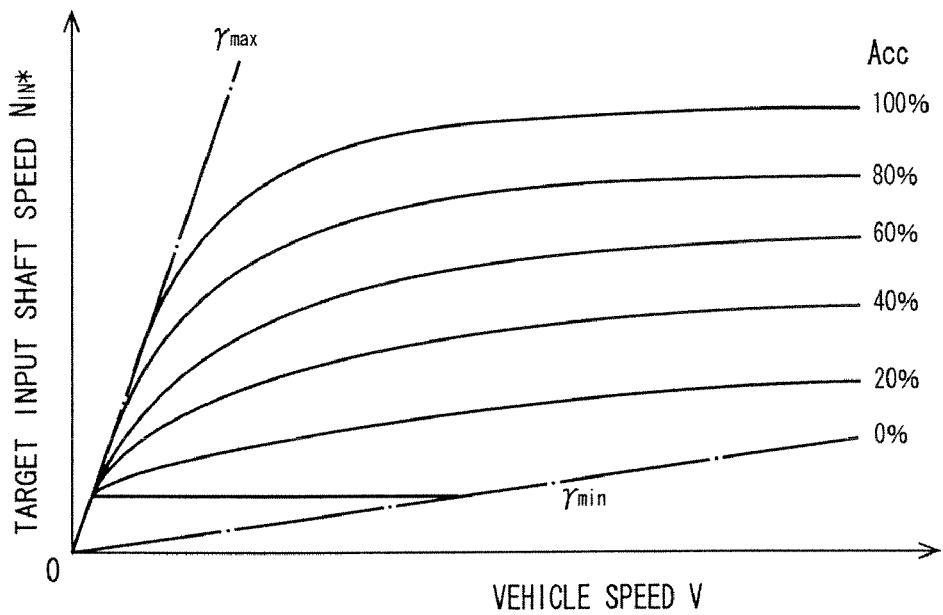
FIG. 4 is a view showing an example of a speed-ratio control map used to set a target value of an input speed of the continuously variable transmission, for controlling a shifting action of the transmission.

Described in detail, the application of the control pressure $P_{S1}$ to the speed-ratio increasing valve 116 and the speed-ratio reducing valve 118 cause the received line pressure PL to be continuously controlled into the speed-ratio control pressure $P_{RATIO}$ to be applied to the input-side hydraulic cylinder 42c, and the application of the control pressure PS2 to the speed-ratio increasing valve 116 causes the working fluid to be discharged from the input-side hydraulic cylinder 42c and drained through the input-output port 116t, input-output port 116i and discharge port 118x, so that the speed-ratio control pressure $P_{RATIO}$ is continuously controlled, The speed-ratio control pressure $P_{RATIO}$ to be applied to the input-side hydraulic cylinder 42 is controlled to continuously change the speed ratio γ of the continuously variable transmission 18 according to a difference $\Delta N_{IN}$ ($=N_{IN}*-N_{IN}$) between the actual speed value $N_{IN}$ of the input shaft 36 (hereinafter referred to as "actual input shaft speed $N_{IN}$") and a target speed value $N_{IN}*$ of the input shaft 36 (hereinafter referred to as "target input shaft speed $N_{IN}*$") which is determined on the basis of the vehicle condition represented by the actual vehicle speed V and accelerator operating amount $A_{CC}$, and according to the stored speed-ratio control map shown in FIG. 4 by way of example, which is a relationship among the accelerator operating amount $A_{CC}$, vehicle speed V and target input speed $N_{IN}*$. As a result, the speed ratio γ of the continuously variable transmission 18 is controlled so that the actual input shaft speed $N_{IN}$ coincides with the target input shaft speed $N_{IN}*$.

The speed-ratio control map of FIG. 4 for controlling the speed ratio γ is formulated such that the target input speed $N_{IN}*$ increases to increase the speed ratio γ with a decrease of the vehicle speed V and an increase of the accelerator operating amount $A_{CC}$. It is noted that the vehicle speed V corresponds to the output shaft speed $N_{OUT}$ and that target input shaft speed $N_{IN}*$ corresponds the target value of the speed ratio γ and is determined within a range between values corresponding to a minimum value $\gamma_{min}$ in and a maximum value $\gamma_{max}$ of the continuously variable transmission 18.

Figure 5:
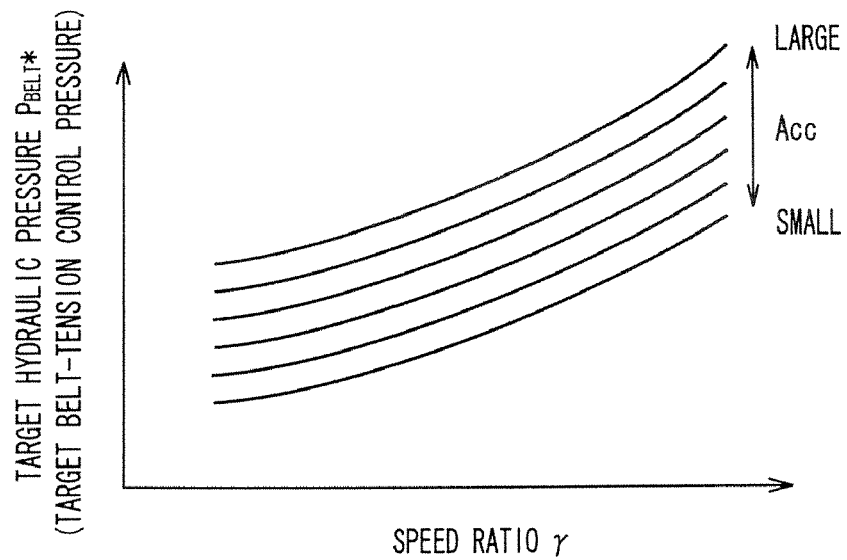
FIG. 5 is an example of a belt-tension control map used to determine the hydraulic pressure required to be applied to the continuously variable transmission, for controlling the belt tension, on the basis of the speed ratio of the transmission and an operating amount of an accelerator pedal.

The belt-tension control valve 110 has an output port 110t, an oil chamber 110c, and a feedback oil chamber 110d, and includes a spool 110a axially movable to open and close the output port 110t, and biasing means in the form of a spring 110b biasing the spool 110a in a direction for opening the output port 110t. The oil chamber 110c accommodates the spring 110b and receives an output pressure in the form of a control pressure $P_{SLT}$ of the linear solenoid valve SLT the duty ratio of which is controlled by the electronic control device 50, to generate a thrust force acting on the spool 11a in a direction for opening the output port 110t. The feedback oil chamber 110d receives the belt-tension control pressure $P_{BELT}$ to generate a thrust force acting on the spool 110a in a direction for closing the output port 110t. The belt-tension control valve 110 is thus arranged to continuously control the line pressure PL into the belt-tension control pressure $P_{BELT}$, according to the control pressure $P_{SLT}$ received as a pilot pressure from the linear solenoid valve SLT, The belt-tension control pressure $P_{BELT}$ to be applied to the output-side hydraulic cylinder 46 is controlled such that the belt-tension control pressure $P_{BELT}$ coincides with a target value $P_{BELT}*$ which is determined on the basis of the vehicle condition represented by the actual speed ratio γ and accelerator operating amount $A_{CC}$, and according to a stored belt-tension control map shown in FIG. 5 by way of example, which is a relationship among the accelerator operating amount $A_{CC}$ (corresponding to a desired torque to be transmitted through the continuously variable transmission 18), speed ratio γ and target belt-tension control pressure $P_{BELT}*$. The belt-tension control map is formulated to prevent slipping of the transmission belt 48. The tension of the transmission belt 48, that is, a force of friction between the transmission belt 48 and the variable-diameter pulleys 42, 46 is controlled according to the belt-tension control pressure $P_{BELT}$ controlled by the belt-tension control valve 110.

Figure 6:
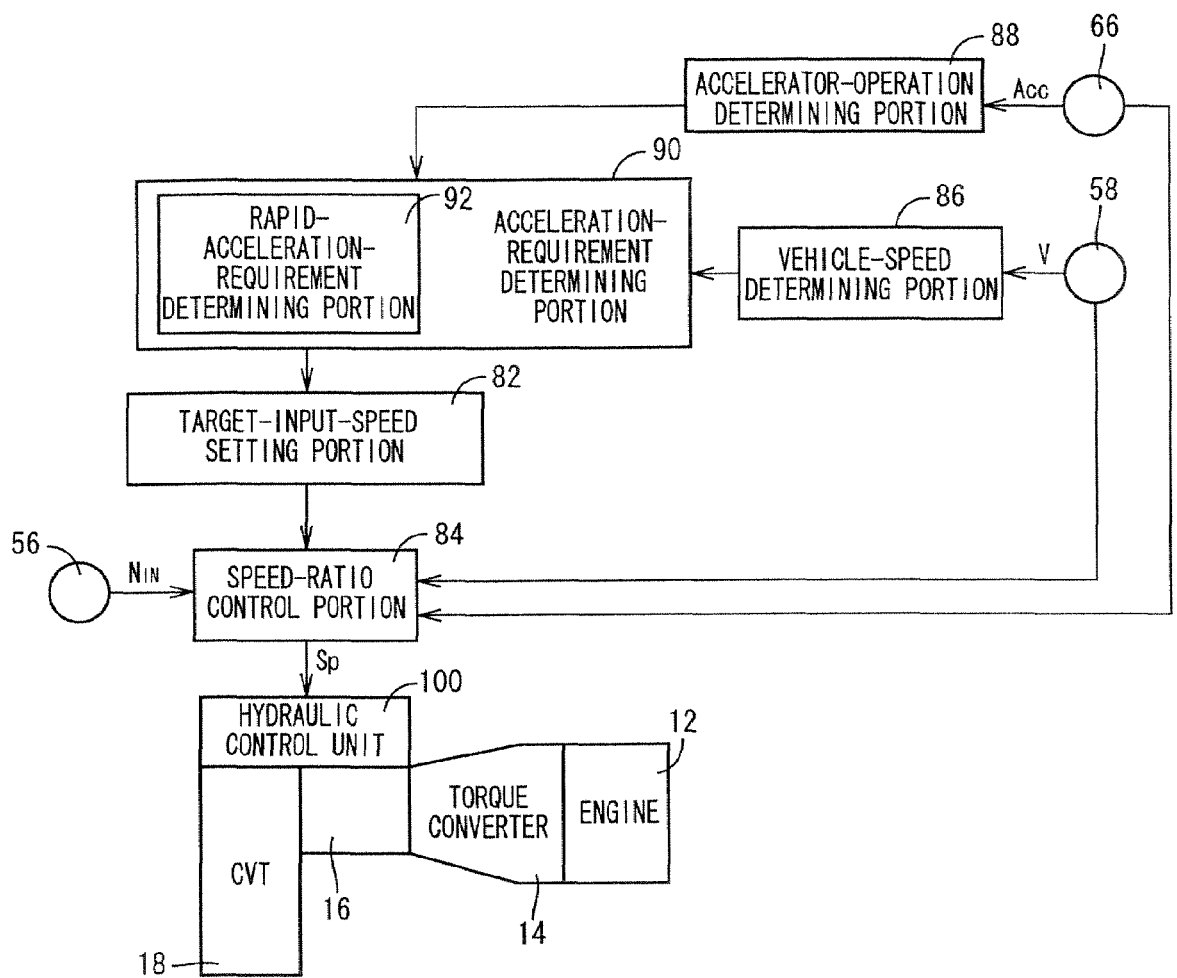
FIG. 6 is a functional block diagram illustrating functional control portions of an electronic control device of the electronic control system of FIG. 2.

Reference is now made to the functional block diagram of FIG. 6 illustrating functional control portions of the electronic control device 50, which include a target-input-speed setting portion 82, a speed-ratio control portion 84, a vehicle-speed determining portion 86, an accelerator-operation determining portion 88, and an acceleration-requirement determining portion 90. The target-input-speed setting portion 82 is arranged to set the target input shaft speed $N_{IN}*$ on the basis of the vehicle condition represented by the detected actual vehicle speed V and accelerator operating amount $A_{CC}$ and according to the stored speed-ratio control map shown in FIG. 4 by way of example.

The speed-ratio control portion 84 is arranged to implement a feedback control of the speed ratio γ of the continuously variable transmission 18 according to the difference $\Delta N_{IN} = N_{IN}^* - N_{IN}$, such that the actual input shaft speed $N_{IN}$ coincides with the target input shaft speed $N_{IN}^*$ set by the target-input-speed setting portion 82. That is, the speed-ratio control portion 84 supplies the hydraulic control unit 100 with a hydraulic command Sp for adjusting the speed-ratio control pressure $P_{RATIO}$ to be applied to the input-side hydraulic cylinder 42c, for thereby continuously changing the speed ratio γ.

According to the hydraulic command Sp received from the speed-ratio control portion 84, the hydraulic control unit 100 controls the solenoid valves DS1 and DS2 to adjust the speed-ratio control pressure $P_{RATIO}$ while adjusting the belt-tension control pressure $P_{BELT}$, for controlling the speed ratio γ of the continuously variable transmission 18.

As described above, the speed ratio γ is controlled by the feedback control of the speed-ratio control pressure $P_{RATIO}$ by the speed-ratio control portion 84 on the basis of the speed difference $\Delta N_{IN}$, so that the rate of change of the speed ratio γ increases with an increase of the speed difference $\Delta N_{IN}$, resulting in a rapid increase of the acceleration value of the vehicle.

In view of the above, the target-input-speed setting portion 82 is arranged to set a transient value $N_{IN}^*_P$ of the target input shaft speed NIN* according to the target input shaft speed $N_{IN}^*$, depending upon whether the acceleration of the vehicle is required by the vehicle operator. The target input shaft speed $N_{IN}^*$ and the transient value $N_{IN}^*_P$ are respectively hereinafter referred to as "basic (final) target input speed $N_{IN}^*_C$" and "transient target input speed $N_{IN}^*_P$". The speed-ratio control portion 84 controls the speed ratio γ of the continuously variable transmission 18 according to a speed difference $\Delta N_{INP}$ (=$N_{IN}^*_P - N_{IN}$) between the actual input shaft speed $N_{IN}$ and the transient target input speed $N_{IN}^*_P$ set by the target-input-speed setting portion 82, such that the actual input shaft speed $N_{IN}$ coincides with the set transient target input speed $N_{IN}^*_P$. Accordingly, the vehicle operator's desire or requirement for acceleration of the vehicle is adequately reflected on the rate of change of the speed ratio γ, which rate of change changes depending upon whether the vehicle acceleration is required or desired by the vehicle operator.

Described in detail, a determination as to whether the vehicle acceleration is required by the vehicle operator is made by the acceleration-requirement determining portion 90, on the basis of an output of the vehicle-speed determining portion 86 and the accelerator-operation determining portion 88. The vehicle-speed determining portion 86 is arranged to determine whether the vehicle speed V is equal to or higher than a predetermined threshold V'.

The accelerator-operation determining portion 88 is arranged to determine whether the operating amount $A_{CC}$ of the accelerator pedal 66 is equal to or larger than a predetermined threshold $A_{CC}'$.

The acceleration-requirement determining portion 90 determines that the vehicle acceleration is required by the vehicle operator, if the vehicle-speed determining portion 86 has determined that the vehicle speed V is equal to or higher than the threshold V', and if the accelerator-operation determining portion 88 has determined that the operating amount $A_{CC}$ of the accelerator pedal 68 serving as the vehicle accelerating member is equal to or larger than the threshold $A_{CC}'$. Thus, the acceleration-requirement determining portion 90 makes the determination as to whether the vehicle acceleration is required by the vehicle operator, on the basis of the vehicle speed V and the accelerator operating amount $A_{CC}$. The threshold V' is a lower limit above which the transient target input speed $N_{IN}^*_P$ is set according to the principle of this invention, and the threshold $A_{CC}'$ is a lower limit above which it is considered that the vehicle acceleration is required by the vehicle operator. For example, the threshold V' is about 20-30 km/h, and the threshold $A_{CC}'$ is about 30-40% of the full 100% operation of the accelerator pedal 68.

During a normal running condition of the vehicle without the determination by the acceleration-requirement determining portion 90 that the vehicle acceleration is required by the vehicle operator, the target-input-speed setting portion 82 sets the transient target input speed $N_{IN}^*_P$ so as to gradually increase toward the basic or final target input speed $N_{IN}^*_C$, for instance, sets the transient target input speed $N_{IN}^*_P$ which has a time lag of first order with respect to the basic target input speed $N_{IN}^*_C$, so that the speed difference $\Delta N_{IN}$ is made smaller for slower acceleration of the vehicle than in the case where the requirement for the vehicle acceleration is determined by the acceleration-requirement determining portion 90. The transient target input speed $N_{IN}^*_P$ which has the time lag of first order with respect to the basic target input speed $N_{IN}^*_C$ is hereinafter referred to as "first-order time-lag transient target input speed $N_{IN}^*_P$".

The first-order time-lag transient target input speed $N_{IN}^*_P$ is generally represented by an equation $N_{IN}^*_{P2}(t) = 1 - e^{-t/T}$, wherein "T" is a time constant. A rate of rise of the transient target input speed $N_{IN}^*_P$ increases and the response of the value $N_{IN}^*_P$ increases, with an increase of the time constant T. For instance, the time constant T is a fixed value predetermined to permit a change of the speed ratio γ without a shifting shock or a delayed shifting of the continuously variable transmission 18, or a variable which varies on the basis of a suitable parameter such as the accelerator operating amount $A_{CC}$ or an amount of change $\Delta A_{CC}$ of the accelerator operating amount $A_{CC}$, and according to a stored predetermined relationship between the parameter and the variable. For example, the time constant T is determined so as to decrease with an increase of the amount of change $\Delta A_{CC}$ per unit time, namely, with a rate of increase $dA_{CC}$ of the accelerator operating amount $A_{CC}$.

Figure 9:
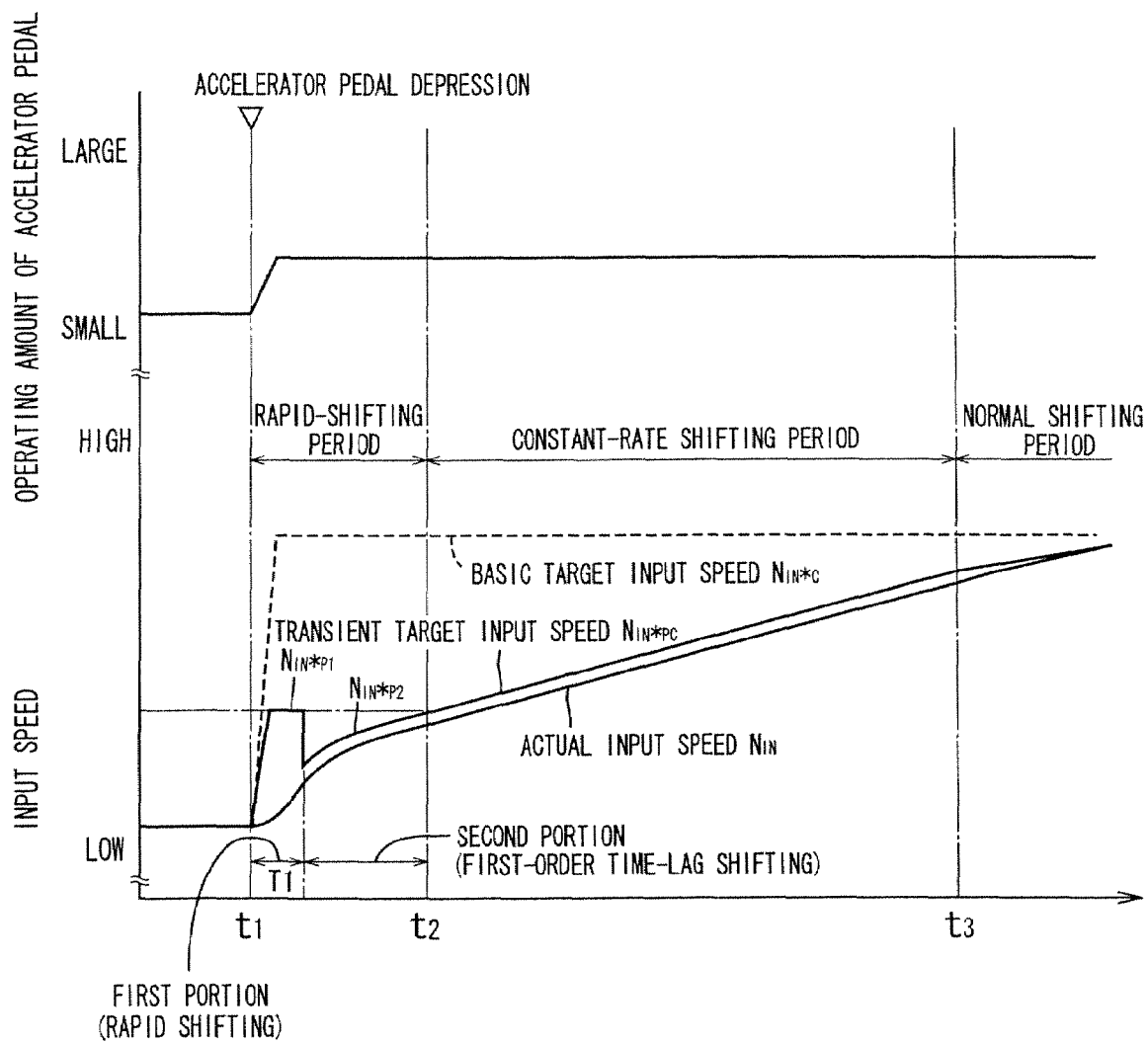
FIG. 9 is a time chart for explaining an operation to control the speed ratio of the transmission according to the flow chart of FIG. 8, upon determination of a requirement for normal or non-rapid acceleration of the vehicle.

During a running condition of the vehicle in which the requirement for non-rapid or normal acceleration is determined by the acceleration-requirement determining portion 90, the target-input-speed setting portion 82 implements an instantaneous stepping increase of the transient target input speed $N_{IN}^*_P$ to a first transient target input speed $N_{IN}^*_{P1}$ sufficiently higher than the actual input shaft speed $N_{IN}$, and holds this first transient target input speed $N_{IN}^*_{P1}$ in a predetermined first portion (T1) of a rapid shifting period, as indicated in the time chart of FIG. 9, so that the speed difference $\Delta N_{IN}$ is made larger for more rapid acceleration of the vehicle than in the case where the requirement for the vehicle acceleration is not determined by the acceleration-requirement determining portion 90. At the end of the first portion of the rapid shifting period, the target-input-speed setting portion 82 instantaneously reduces the transient target input speed $N_{IN}^*_P$ down to the actual input shaft speed $N_{IN}$ or an initial value of a second transient target input speed $N_{IN}^*_{P2}$, which initial is close to the actual input shaft speed $N_{IN}$ and lower than the first transient target input speed $N_{IN}^*_{P1}$. In a predetermined second portion of the rapid shifting period which follows the first portion and which begins with the above-indicated instantaneous reduction of the transient target input speed $N_{IN}^*_P$, the target-input-speed setting portion 82 gradually increases the second transient target input speed $N_{IN}^*_{P2}$ back toward the first transient target input speed $N_{IN}^*_{P1}$, for example, along a predetermined curve of a first-order time-lag, as also indicated in FIG. 9, so that the speed difference $\Delta N_{IN}$ is made smaller for slower acceleration of the vehicle.

Thus, during the rapid shifting period consisting of the first and second portions, the transient target input speed $N_{IN}{}^*_P$ is set so that the actual input shaft speed $N_{IN}$ changes (increases) non-linearly along a predetermined curve, as indicated in FIG. 9 by way of example, in other words, so that the speed ratio γ changes non-linearly along a predetermined curve.

During a constant-rate shifting period following the second portion of the rapid shifting period in which the second transient target input speed $N_{IN}{}^*_{P2}$ is set, the target-input-speed setting portion 82 sets a constant-speed-shifting transient target input speed $N_{IN}{}^*_{PC}$ such that this speed $N_{IN}{}^*_{PC}$ increases at a relatively low rate toward the basic or final transient target input speed $N_{IN}{}^*_C$. Thus, during the constant-rate shifting period, the constant-speed-shifting transient target input speed $N_{IN}{}^*_{PC}$ is set so that the actual input shaft speed $N_{IN}$ changes at a predetermined constant rate, as indicated in FIG. 9 by way of example, in other words, so that the speed ratio γ changes at a predetermined constant rate.

During a normal shifting period following the constant-rate shifting period in which the speed difference $\Delta N_{IN}$ is smaller that a predetermined value, the speed-ratio control portion 84 controls the speed ratio γ of the continuously variable transmission 18 such that the actual input shaft speed $N_{IN}$ coincides with the basic or final target input speed $N_{IN}{}^*_C$.

Figure 7:
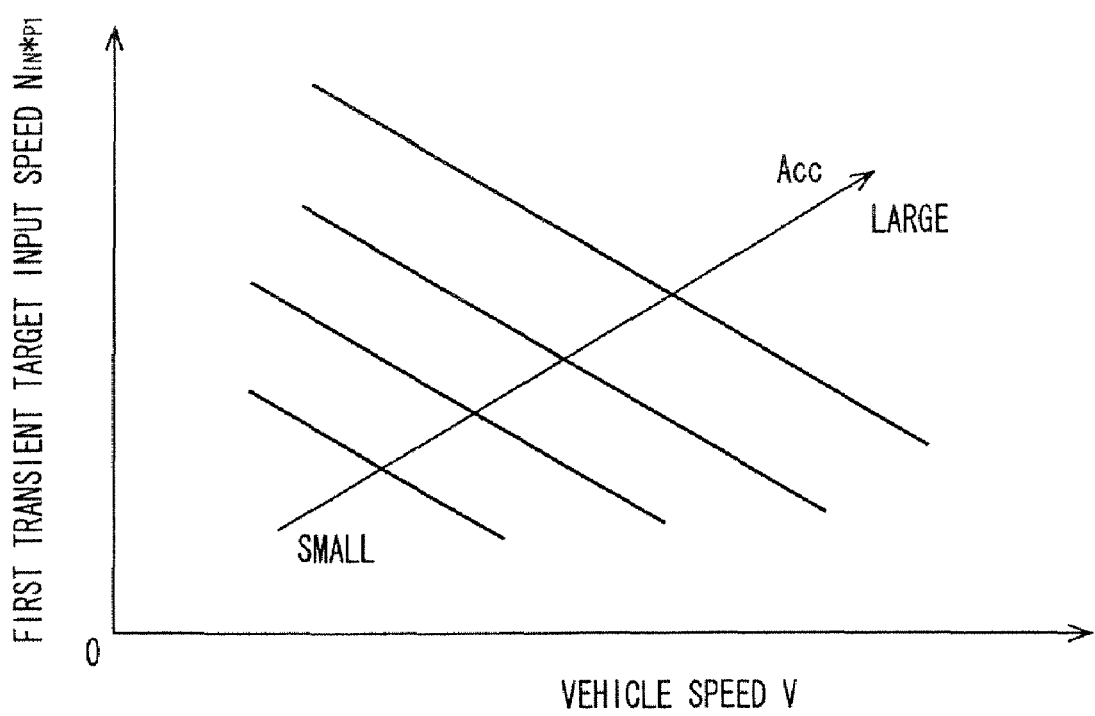
FIG. 7 is a view showing an example of a speed-ratio control map used to set a first transient target value of the input speed of the continuously variable transmission, for controlling the shifting action of the transmission.

As described above, the target-input-speed setting portion 82 is operable to set the transient target input speed $N_{IN}{}^*_P$ upon determination of the requirement for the vehicle acceleration during a shifting operation of the continuously variable transmission 18 so that the vehicle is accelerated at a rate as desired by the vehicle operator, Described in detail, the target-input-speed setting portion 82 sets the first transient target input speed $N_{IN}{}^*_{P1}$ on the basis of the vehicle condition represented by the actual vehicle speed and accelerator operating amount $A_{CC}$ and according to a stored speed-ratio control map shown in FIG. 7 by way of example, which is a relationship among the first transient target input speed $N_{IN}{}^*_{P1}$, accelerator operating amount $A_{CC}$ and vehicle speed V.

The speed-ratio control map of FIG. 7 corresponds to the speed-ratio control map of FIG. 4 as modified to determine the first transient target input speed $N_{IN}{}^*_{P1}$ such that the first transient target input speed $N_{IN}{}^*_{P1}$ increases for increasing the speed ratio γ, with a decrease of the vehicle speed V and with an increase of the accelerator operating amount $A_{CC}$.

The target-input-speed setting portion 82 holds the first transient target input speed $N_{IN}{}^*_{P1}$ until a predetermined length of time T1 has passed after the moment of determination by the acceleration-requirement determining portion 90 that the vehicle acceleration is required by the vehicle operator. This length of time T1 may be a fixed value predetermined to change the speed ratio γ for rapid acceleration of the vehicle for driving the vehicle with a high degree of drivability as desired by the vehicle operator, or a variable which varies on the basis of a suitable parameter such as the accelerator operating amount $A_{CC}$, amount of change $\Delta A_{CC}$ of the accelerating operating amount $A_{CC}$ or vehicle speed V, and according to a stored predetermined relationship between the variable and the parameter. For example, the length of time T1 varies with an increase of the amount of change $A_{CC}$ of the accelerator operating amount $A_{CC}$.

Figure 10:
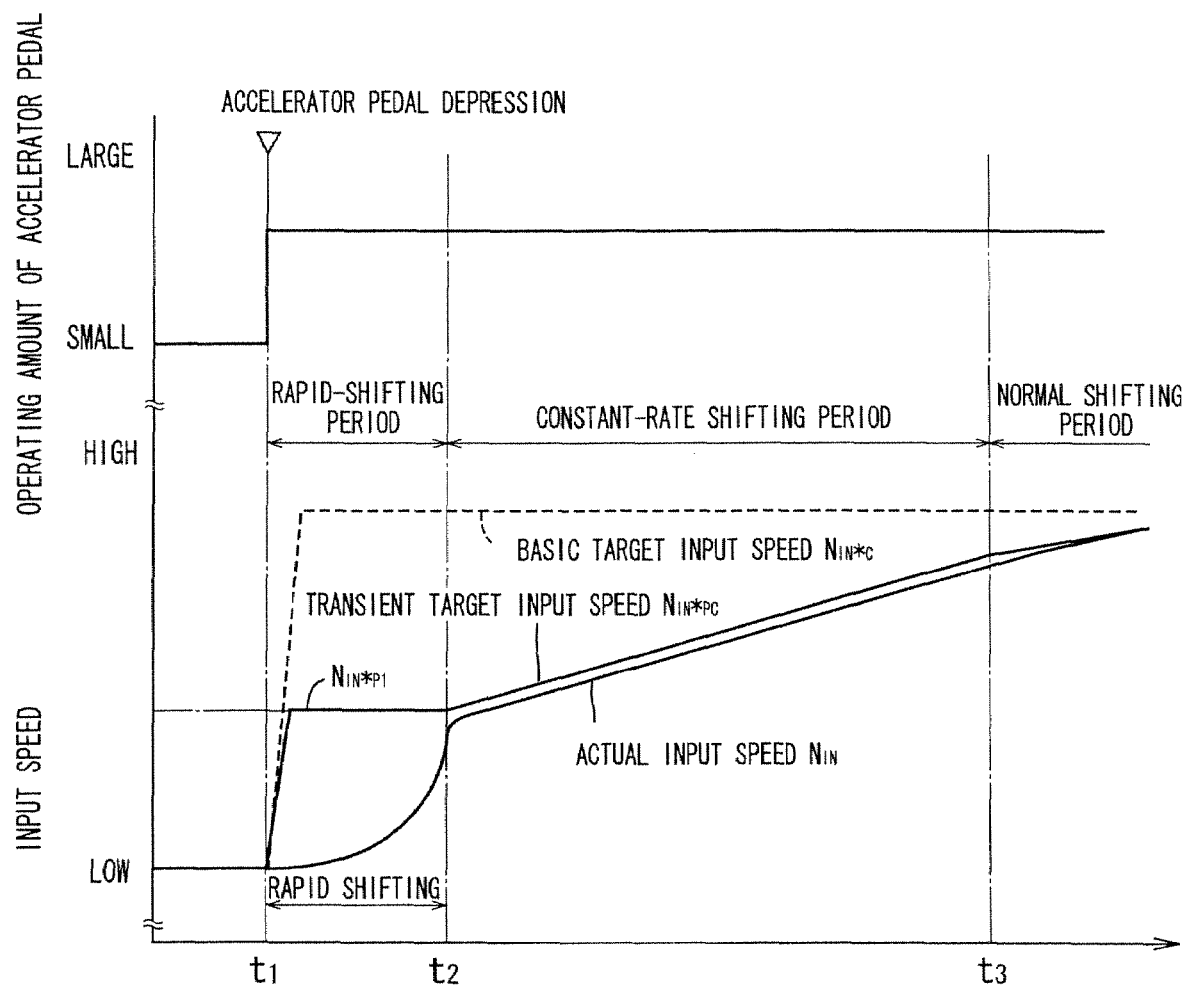
FIG. 10 is a time chart for explaining an operation to control the speed ratio of the transmission according to the flow chart of FIG. 8, upon determination of a requirement for rapid acceleration of the vehicle.

In the second portion of the rapid shifting period from the moment of expiration of the predetermined length of time T1 to the moment when the speed difference $N_{INP1}$ ($=N_{IN*P1}-N_{IN}$) between the first transient target input speed $N_{IN}{}^*_{P1}$ and the actual input shaft speed $N_{IN}$ has been reduced to a predetermined value $N_{IN}$', the target-input-speed setting portion holds the second transient target input speed $N_{IN*P2}$ so that the speed ratio γ is changed at a rate lower than the rate while the transient target input speed $N_{IN*P}$ was held at the first transient target input speed $N_{IN*P1}$ for rapid change of the speed ratio γ in the first portion of the rapid shifting period. Like the first-order time-lag transient target input speed $N_{IN}{}^*_P$ used during the normal shifting period as described above, the first-order time-lag second transient target input speed $N_{IN}{}^*_{P2}$ is represented by an equation $N_{IN}{}^*_{P2}(t)=1-e^{-t/T}$. The time constant T is a fixed value predetermined to permit a change of the speed ratio γ without a shifting shock or a delayed shifting of the continuously variable transmission 18, or a variable which varies on the basis of a suitable parameter such as the accelerator operating amount $A_{CC}$ or an amount of change $\Delta A_{CC}$ of the accelerator operating amount $A_{CC}$, and according to a stored predetermined relationship between the parameter and the variable. For example, the time constant T is determined so as to increase with an increase of the amount of change $\Delta A_{CC}$.

Where the acceleration-requirement determining portion 90 has determined that the degree of requirement for the vehicle acceleration is higher than a predetermined threshold for rapid acceleration of the vehicle, the target-input-speed setting portion 82 holds the transient target input speed $N_{IN}{}^*_P$ at the first transient target input speed $N_{IN}{}^*_{P1}$ during the entire rapid shifting period, without the following setting at the second transient target input speed $N_{IN}{}^*_{P2}$ during this period, so that the vehicle is accelerated at a higher rate than in the case where the degree of requirement for the vehicle acceleration is not higher than the predetermined threshold. In this case, the target-input-speed setting portion 82 does not hold the first transient input speed $N_{IN}{}^*_{P1}$ for only the predetermined length of time T1, but maintains the first transient target input speed $N_{IN}{}^*_{P1}$ from the moment of determination by the acceleration-requirement determining portion 90 that the vehicle acceleration is required, up to the moment when the speed difference $\Delta N_{INP1}$ ($=N_{IN}{}^*_{P1}-N_{IN}$) between the first transient target input speed $N_{IN}{}^*_{P1}$ and the actual input shaft speed $N_{IN}$ has been reduced to the predetermined value $N_{IN}$'. Namely, during the rapid shifting period in which the degree of requirement for the vehicle acceleration is higher than the predetermined threshold, the transient target input speed $N_{IN}{}^*_P$ is held at the first transient target input speed $N_{IN}{}^*_{P1}$, so that the actual input shaft speed $N_{IN}$ increases non-linearly along a predetermined curve, as indicated in FIG. 10 by way of example, at a higher rate than in the case where the degree of requirement for the vehicle acceleration is not higher than the predetermined threshold. Thus, where the rapid acceleration of the vehicle is required, the transient-input-speed setting portion 82 sets the transient target input speed $N_{IN}{}^*_P$ so as to permit rapid acceleration of the vehicle as desired by the vehicle operator.

For determining the rapid acceleration of the vehicle, that is, for determining that the degree of requirement for vehicle acceleration is higher than the predetermined threshold, the accelerator-operation determining portion 88 is further arranged to determine whether the accelerator operating amount $A_{CC}$ is equal to or larger than a predetermined second threshold $A_{CC2}$', and to determine whether a rate of increase $dA_{CC}$ of the accelerator operating amount $A_{CC}$ is equal to or higher than a predetermined threshold $dA_{CC}$'.

Further, the acceleration-requirement determining portion 90 includes a rapid-acceleration-requirement determining portion 92 operable to determine that rapid acceleration of the vehicle is required by the vehicle operator, if the accelerator-operation determining portion 88 has determined that the accelerator operating amount $A_{CC}$ is equal to or larger than the predetermined second threshold $A_{CC2}$' or the rate of increase $dA_{CC}$ of the accelerator operating amount $A_{CC}$ is equal to or higher than the predetermined threshold $dA_{CC}$'. Thus, the rapid-acceleration-requirement determining portion 92 is arranged to make the determine as to whether the rapid acceleration of the vehicle is required by the vehicle operator, on the basis of the manner of operation of the accelerator pedal 68. The second threshold $A_{CC2}'$ and the threshold $dA_{CC}'$ are upper limits above which it is considered that the rapid vehicle acceleration is required by the vehicle operator who has depressed the accelerator pedal 68 by a large amount and/or rapidly. For example, the second threshold $A_{CC2}'$ is about 70-80% of the full 100 operation of the accelerator pedal 68, and the threshold $dA_{CC}'$ is an amount of change $\Delta A_{CC}$ of about several % to the order of 10% per cycle time of a control routine illustrated in the flow chart of FIG. 8 which will be described.

The rapid-acceleration-requirement determining portion 92 is further arranged to turn off a SHIFTING-RATE GUARD flag if the rapid-acceleration-requirement determining portion 92 has determined that the rapid vehicle acceleration is required by the vehicle operator, and to turn on the SHIFTING-RATE GUARD flag if the rapid-acceleration-requirement determining portion 92 has not determined that the rapid vehicle acceleration is required by the vehicle operator.

When the SHIFTING-RATE GUARD flag is held in the on state by the rapid-acceleration-requirement determining portion 92, the target-input-speed determining portion 82 sets the transient target input speed $N_{IN}{}^*_P$ at the first transient target input speed $N_{IN}{}^*_{P1}$ and the second transient target input speed $N_{IN}{}^*_{P2}$ during the rapid shifting period (in the respective first and second portions), so that the speed ratio γ is changed at a rate suitable for the degree of requirement for normal or non-rapid acceleration of the vehicle, which is not higher than the predetermined threshold. When the SHIFTING-RATE GUARD flag is held in the off state by the rapid-acceleration-requirement determining portion 92, on the other hand, the target-input-speed determining portion 82 sets the transient target input speed $N_{IN}{}^*_P$ at the first transient target input speed $N_{IN}{}^*_{P1}$, without setting at the second transient target input speed $N_{IN}{}^*_{P2}$, during the rapid shifting period, so that the speed ratio γ is changed at a rate suitable for the degree of requirement for rapid acceleration of the vehicle, which is higher than the predetermined threshold.

Figure 8:
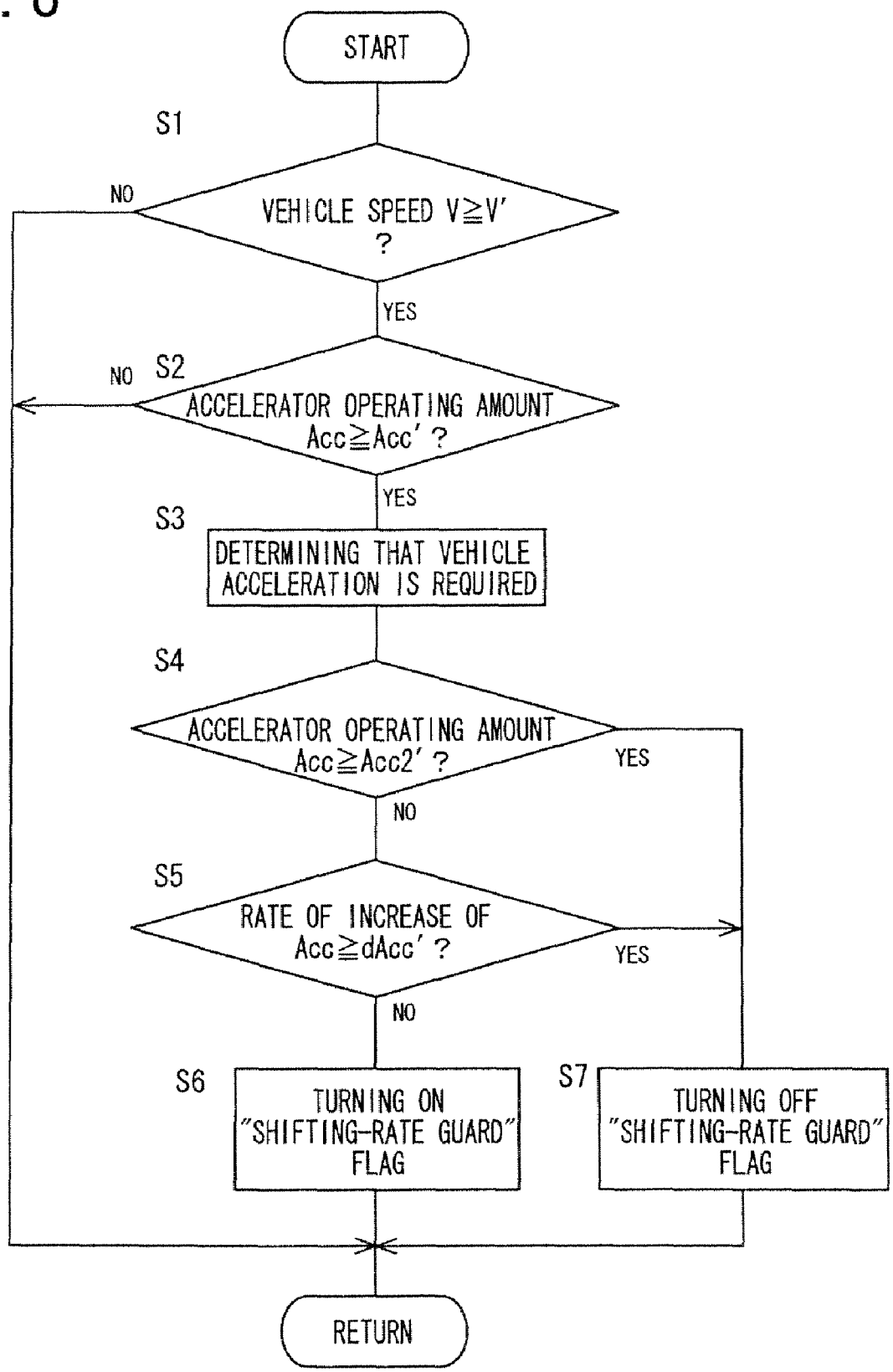
FIG. 8 is a flow chart illustrating a control routine executed by the electronic control unit shown in FIG. 2, to set the target input speed value of the continuously variable transmission, upon determination of a requirement for acceleration of the vehicle, for controlling the speed ratio of the continuously variable transmission.

Referring next to the flow chart of FIG. 8, there is illustrated the control routine executed by the electronic control unit 50 to set the target input shaft speed $N_{IN}{}^*$ of the continuously variable transmission, upon determination of the requirement for acceleration of the vehicle, for controlling the speed ratio of the continuously variable transmission 18. This control routine is repeatedly executed with an extremely short cycle time of about several milliseconds to several tens of milliseconds. The time charts of FIGS. 9 and 10 respectively explain operations to control the speed ratio of the continuously variable transmission 18 according to the flow chart of FIG. 8, upon determination of a requirement for non-rapid acceleration of the vehicle (FIG. 9), and upon determination of a requirement for rapid acceleration of the vehicle (FIG. 10).

The control routine of FIG. 8 is initiated with step S1 corresponding to the vehicle-speed determining portion 86, to determine whether the vehicle speed V is equal to or higher than the predetermined threshold V. If an affirmative decision (YES) is obtained in step S2, the control flow goes to step S2 corresponding to the accelerator-operation determining portion 88, to determine whether the operating amount $A_{CC}$ of the accelerator pedal 68 is equal to or larger than the predetermined threshold $A_{CC}'$.

If a negative decision (NO) is obtained in step S1 or step S2, one cycle of execution of the present control routine is terminated. In this case, the acceleration-requirement determining portion 90 determines that the acceleration of the vehicle is not required by the vehicle operator, and the target-input-speed setting portion 82 sets the transient target input speed $N_{IN}{}^*_P$ such that this value $N_{IN}{}^*_P$ gradually increases toward the final or basic target value $N_{IN}{}^*_C$, along the predetermined curve of the first-order time lag, for example, while the speed-ratio control portion 84 controls the speed ratio γ of the continuously variable transmission 18 in the normal running condition of the vehicle without the requirement for vehicle acceleration, such that the actual input shaft speed $N_{IN}$ coincides with the transient target input speed $N_{IN}{}^*_P$. As a result, the speed ratio γ is changed at a rate suitable for preventing a shifting shock or a delayed shifting of the continuously variable transmission 18.

If the affirmative decision (YES) is obtained in step S1 and if an affirmative decision (YES) is obtained in step S2, the control flow goes to step S3 corresponding to the acceleration-requirement determining portion 90, to determine that the vehicle acceleration is required by the vehicle operator.

Step S3 is followed by step S4 corresponding to the accelerator-operation determining portion 88, to determine whether the accelerator operating amount $A_{CC}$ is equal to or larger than the predetermined second threshold $A_{CC}2'$. If a negative decision (NO) is obtained in step S4, the control flow goes to step S5 also corresponding to the accelerator-operation determining portion 88, to determine whether the rate of increase $dA_{CC}$ of the operating amount $A_{CC}$ is equal to or higher than the predetermined threshold $dA_{CC}'$.

If the negative decision (NO) is obtained in step S4 and if a negative decision (NO) is obtained in step S5, the control flow goes to step S6 corresponding to the rapid-acceleration-requirement determining portion 92, to determine that the required for rapid acceleration of the vehicle is not required by the vehicle operator, and to turn on the SHIFTING-RATE GUARD flag.

While the SHIFTING-RATE GUARD flag is held in the on state, the target-input-speed setting portion 82 holds the transient target input speed $N_{IN}{}^*_P$ at the first transient target input speed $N_{IN}{}^*_{P1}$ in the first portion of the rapid shifting period, that is, until the predetermined length of time T1 has passed or expired after the moment of the determination in step S3 that the vehicle acceleration is required. After the length of time T1 has expired, the target-input-speed setting portion 82 holds the transient target input speed $N_{IN}{}^*_P$ at the second transient target input speed $N_{IN}{}^*_{P2}$ in the second portion of the rapid shifting period, that is, until the speed difference $\Delta N_{INP1}$ has been reduced to the predetermined value $\Delta N_{IN}'$. Then, the target-input-speed setting portion 82 holds the transient target input speed $N_{IN}{}^*_P$ at the constant-rate-shifting transient target input speed $N_{IN}{}^*_{PC}$ during the constant-rate shifting period, such that the value $N_{IN}{}^*_{PC}$ gradually increases at a predetermined rate toward the final or basic target value $N_{IN}{}^*_C$. The speed-ratio control portion 84 controls the speed ratio γ of the continuously variable transmission 18 such that the actual input shaft speed NIN coincides with the first, second and constant-rate-shifting transient target input speed values $N_{IN}{}^*_{P1}$, $N_{IN}{}^*_{P2}$ and $N_{IN}{}^*_{PC}$. Accordingly, the speed ratio γ is initially changed at a comparatively high rate for relatively rapid acceleration of the vehicle, and is subsequently changed at a comparatively low rate for relatively slow acceleration of the vehicle, whereby the vehicle is accelerated as required or desired by the vehicle operator, namely, the vehicle operator's desire regarding the vehicle acceleration is adequately reflected on the rate of change of the speed ratio γ of the continuously variable transmission 18.

In the time chart of FIG. 9, the SHIFTING-RATE GUARD flag is turned on at a point of time t1, as a result of a depressing operation of the accelerator pedal 68. In the first portion of the rapid shifting period T1 beginning at the point of time t1, the transient target input speed $N_{IN}{}^*_P$ is instantaneously increased to the first transient target value $N_{IN}{}^*_{P1}$ and is held at this value $N_{IN}{}^*_{P1}$. In the second portion of the rapid shifting period which follows the first portion and which ends at a point of time t2, the transient target input speed $N_{IN}{}^*_P$ is set to the second transient target value $N_{IN}*_{P2}$, which is initially set at a value slightly higher than the actual input shaft speed $N_{IN}$ is subsequently gradually increased toward the first transient target value $N_{IN}*_{P1}$ along the predetermined first-order time-lag curve. Accordingly, the actual input shaft speed $N_{IN}$ is initially increased at a comparatively high rate in the first portion of the rapid shifting period T1, and is subsequently increased at a comparatively low rate in the second portion of the rapid shifting period ending at the point of time t2. During the constant-rate-shifting period from the point of time t2 to a point of time t3, the transient target input speed $N_{IN}*_P$ is set to the constant-rate-shifting transient value $N_{IN}*_{PC}$, which is gradually increased at a predetermined constant rate toward the final or basic target value $N_{IN}*_C$, so that the actual input speed $N_{IN}$ increases at a comparatively low rate, following the constant-rate-shifting transient target value $N_{IN}*_{PC}$. During the normal shifting period beginning at the point of time t3, the speed ratio γ is controlled such that the actual input shaft speed $N_{IN}$ coincides with the basic or final target value $N_{IN}*_C$.

If an affirmative decision (YES) is obtained in step S4 or step S5, the control flow goes to step S7 also corresponding to the rapid-acceleration-requirement determining portion 92, to determine that the rapid acceleration of the vehicle is required by the vehicle operator, and to turn off the SHIFTING-RATE GUARD flag, While the SHIFTING-RATE GUARD flag is held in the off state, the target-input-speed setting portion 82 holds the transient target input speed $N_{IN}*_P$ at the first transient target input speed $N_{IN}*_{P1}$ during the entire rapid shifting period (first and second portions) beginning at the moment of determination in step S3, until the speed difference $\Delta N_{INP1}$ has been reduced to the predetermined value $\Delta N_{IN}'$, without setting at the second transient target input speed $N_{IN}*_{P2}$, which is set in the second portion of the rapid shifting period where the non-rapid acceleration of the vehicle is required. Then, the target-input-speed setting portion 82 holds the transient target input speed $N_{IN}*_P$ at the constant-rate-shifting transient target input speed $N_{IN}*_{PC}$ during the constant-rate shifting period, such that the value $N_{IN}*_{PC}$ gradually increases at the predetermined rate toward the final or basic target value $N_{IN}*_C$. The speed-ratio control portion 84 controls the speed ratio γ of the continuously variable transmission 18 such that the actual input shaft speed NIN coincides with the first and constant-rate-shifting transient target input speed values $N_{IN}*_{P1}$ and $N_{IN}*_{PC}$, so that the speed ratio γ is changed at a comparatively high rate for rapid acceleration of the vehicle, in the first and second portions of the rapid shifting periods, whereby the vehicle operator's desire for rapid acceleration of the vehicle is adequately reflected on the rate of change of the speed ratio γ of the continuously variable transmission 18.

In the time chart of FIG. 10, the SHIFTING-RATE GUARD flag is turned off at the point of time t1, as a result of a depressing operation of the accelerator pedal 68. During the entire shifting period from the point of time t1 to the point of time t2, the transient target input speed $N_{IN}*_P$ is instantaneously increased to the first transient target value $N_{IN}*_{P1}$ and is held at this value $N_{IN}*_{P1}$, so that the actual input shaft speed $N_{IN}$ is increased at a comparatively high rate during the rapid shifting period. During the constant-rate-shifting period from the point of time t2 to the point of time t3, the transient target input speed $N_{IN}*_P$ is set to the constant-rate-shifting transient value $N_{IN}*_{PC}$, which is gradually increased at a predetermined constant rate toward the final or basic target value $N_{IN}*_C$, so that the actual input speed $N_{IN}$ increases at a comparatively low rate, following the constant-rate-shifting transient target value $N_{IN}*_{PC}$. During the normal shifting period beginning at the point of time t3, the speed ratio γ is controlled such that the actual input shaft speed $N_{IN}$ coincides with the basic or final target value $N_{IN}*_C$.

In the speed-ratio control apparatus according to the present embodiment of the invention described above, the target-input-speed setting portion 82 implements an instantaneous stepping increase of the transient target input speed $N_{IN}*_P$ to the first transient target value $N_{IN}*_{P1}$ and holds the transient target input speed $N_{IN}*_P$ at the first transient target value $N_{IN}*_{P1}$, in the first portion of the shifting period, when the acceleration-requirement determining portion 90 has determined, on the basis of the operating amount $A_{CC}$ of the accelerator pedal 68, that the non-rapid or normal acceleration (not the rapid acceleration) of the vehicle is required by the vehicle operator. At the end of the first portion of the rapid shifting period, the target-input-speed setting portion 82 instantaneously reduces the transient target input speed $N_{IN}*_P$ down to the actual input shaft speed $N_{IN}$ or an initial value of the second transient target input speed $N_{IN}*_{P2}$, which initial value is close to the actual input shaft speed $N_{IN}$ and lower than the first transient target input speed $N_{IN}*_{P1}$. In the second portion of the rapid shifting period following the first portion, the target-input-speed setting portion 82 gradually increases the second transient target input speed $N_{IN}*_{P2}$ back toward the first transient target input speed $N_{IN}*_{P2}$. Accordingly, the speed ratio γ of the continuously variable transmission 18 is initially changed at a comparatively high rate in the first portion of the rapid shifting period, for relatively rapid acceleration of the vehicle according to the operation of the accelerator pedal 68, and subsequently changed at a comparatively low rate in the second portion of the rapid shifting period, for relatively slow acceleration of the vehicle, so that the vehicle is accelerated at an adequately controlled rate during the control of the speed ratio γ, whereby the vehicle operator's desire regarding the acceleration of the vehicle is adequately reflected on the rate of change of the speed ratio γ.

When the acceleration-requirement determining portion 90 has determined that the rapid acceleration of the vehicle is required by the vehicle operator, the target-input-speed setting portion 82 holds the first transient target input speed $N_{IN}*_{P1}$ as the transient target input speed $N_{IN}*_P$ during the entire rapid shifting period, without setting at the second transient target value $N_{IN}*_{P2}$, so that the speed ratio γ of the continuously variable transmission 18 is changed during the entire rapid shifting period, at a high rate for rapid acceleration of the vehicle according to a rapid depressing operation of the accelerator pedal 68, whereby the vehicle operator's desire for rapid acceleration of the vehicle is adequately reflected on the rate of change of the speed ratio γ. Thus, the transient target input speed $N_{IN}*_P$ is set differently depending upon whether the non-rapid acceleration or rapid acceleration of the vehicle is required by the vehicle operator, so that the speed ratio γ of the continuously variable transmission 18 is controlled at a rate according to the vehicle operator's desire regarding the vehicle acceleration.

The present embodiment is further arranged such that the second transient target input speed $N_{IN}*_{P2}$, which is initially close to the actual input shaft speed $N_{IN}$, is increased back toward the first transient target value $N_{IN}*_{P1}$, along the curve of the first-order time lag, so that the speed ratio γ is changed at a relatively low rate suitable for relatively slow acceleration of the vehicle while preventing a shifting shock or a delayed shifting of the continuously variable transmission, in the second portion of the rapid shifting period following the first portion in which the speed ratio is changed at a relatively high rate.

In the present embodiment, the time constant T in the equation representing the curve of the first-order time lag decreases with an increase of the rate of increase $dA_{CC}$ of the accelerator operating amount $A_{CC}$, so that the rate of change of the speed ratio γ in the second portion of the rapid shifting period increases with an increase of the degree of requirement for acceleration of the vehicle as a result of an operation of the accelerator pedal 68 by the vehicle operator, so that the vehicle operator's requirement regarding the vehicle acceleration can be more adequately reflected on the rate of change of the speed ratio γ of the continuously variable transmission 18.

In the present embodiment, the first transient target input speed $N_{IN}^{*}{}_{P}$ is determined on the basis of the operating amount $A_{CC}$ of the accelerator pedal 68 and the vehicle speed V, so that the vehicle operator's desire regarding the vehicle acceleration can be more adequately reflected on the rate of change of the speed ratio γ of the continuously variable transmission 18.

In the present embodiment, the first portion of the rapid shifting period, that is, the predetermined length of time T1 is determined on the basis of the rate of increase $dA_{CC}$ of the accelerator operating amount $A_{CC}$, so that the vehicle operator's desire regarding the vehicle acceleration can be more adequately reflected on the rate of change of the speed ratio γ of the continuously variable transmission 18.

Referring next to the fragmentary flow chart of FIG. 11, a second embodiment of this invention will be described. In the second embodiment, the same reference signs as used in the first embodiment will be used to identify the functionally corresponding elements, which will not be described.

In the first embodiment described above, the rapid-acceleration-requirement determining portion 92 is arranged to make the determination that the rapid acceleration of the vehicle is required, if the accelerator-operation determining portion 88 has determined that the operating amount $A_{CC}$ of the accelerator pedal 68 is equal to or larger than the second threshold $A_{CC2}'$, or that the rate of increase $dA_{CC}$ of the accelerator operating amount $A_{CC}$ is equal to or higher than the threshold $d_{ACC}'$. In the present second embodiment, however, the rapid-acceleration-requirement determining portion 92 is arranged to make the determination that the rapid acceleration of the vehicle is required, if the accelerator-operation determining portion 88 has determined that the operating amount $A_{CC}$ of the accelerator pedal 68 is equal to or larger than the second threshold $A_{CC2}'$, and if the accelerator-operation determining portion 88 has determined that the rate of increase $dA_{CC}$ of the accelerator operating amount $A_{CC}$ is equal to or higher than the threshold $d_{ACC}'$.

Figure 11:
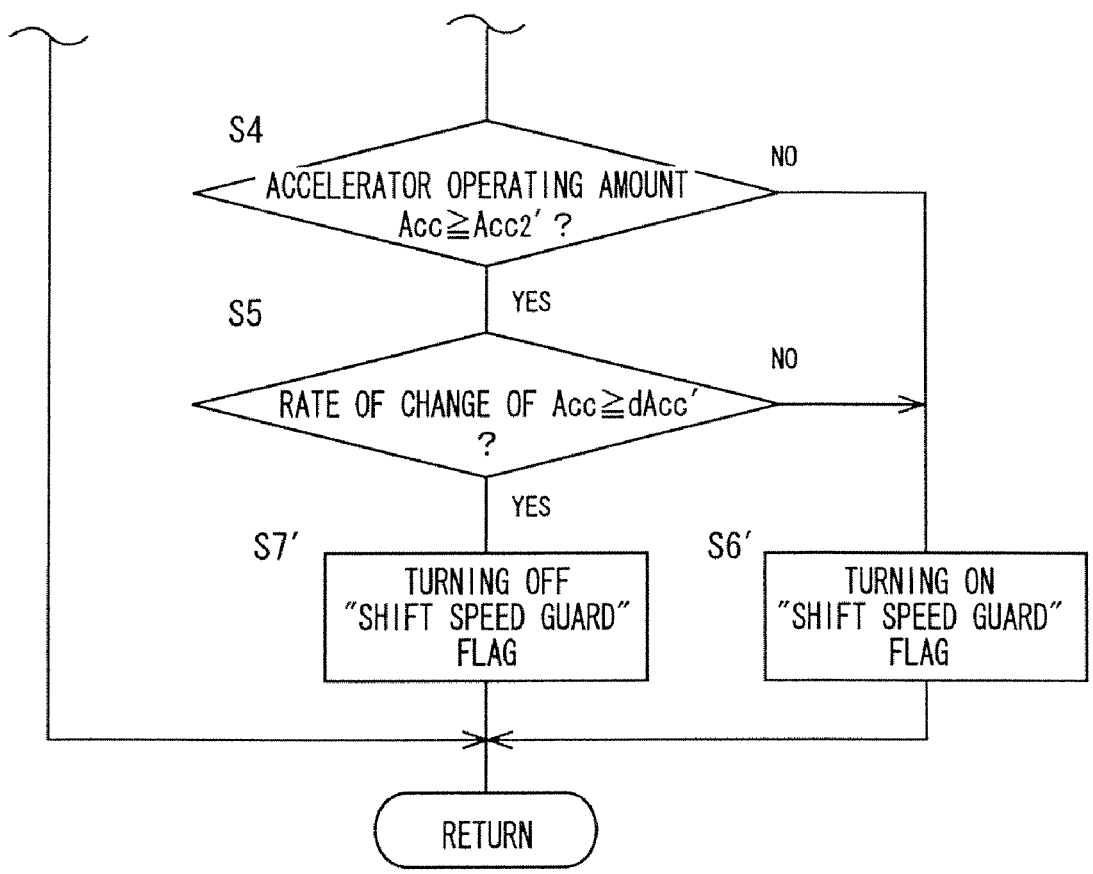
FIG. 11 is a fragmentary flow chart corresponding to the flow chart of FIG. 8, which illustrates steps of a control routine to set the target input speed according to another embodiment of this invention, which steps are different from those of the flow chart of FIG. 8.

The fragmentary flow chart of FIG. 11, which corresponds to the flow chart of FIG. 8, illustrates steps S4, S5, S6' and S7' of a control routine to set the target input speed $N_{IN}^{*}$ according to the second embodiment, which steps are different from those of the flow chart of FIG. 8.

The determinations made in steps S4 and S5 of the flow chart of FIG. 11 are identical with those in steps S4 and S5 of the flow chart of FIG. 8.

If the negative decision (NO) is obtained in step S4 or step S5, the control flow goes to step S6' corresponding to the rapid-acceleration-requirement determining portion 92, to determine that the rapid acceleration of the vehicle is not required by the vehicle operator, and to turn on the SHIFTING-RATE GUARD flag.

If the affirmative decision (YES) is obtained in both of step S4 and step S5, the control flow goes to step S7' corresponding to the rapid-acceleration-requirement determining portion 92, to determine that the rapid acceleration of the vehicle is required by the vehicle operator, and to turn off the SHIFTING-RATE GUARD flag.

In the second embodiment described above, the transient target input speed $N_{IN}^{*}{}_{P}$ is set differently depending upon whether the non-rapid or rapid acceleration of the vehicle is required by the vehicle operator. The second embodiment has the same advantage as the first embodiment that the vehicle is accelerated at a rate according to the operator's requirement for acceleration of the vehicle.

While the preferred embodiments of this invention have been described in detail by reference to the drawings, it is to be understood that the present invention may be otherwise embodied.

For example, each of the speed-ratio control maps of FIGS. 4 and 7 used in the illustrated embodiments may be provided in a plurality of patterns corresponding to respective different amounts of change $\Delta A_{CC}$ of the operating amount $A_{CC}$ of the accelerator pedal 68. These patterns of the speed-ratio control maps may be formulated such that the target input speed $N_{IN}^{*}$ or first transient target input speed $N_{IN}^{*}{}_{P1}$ increases with an increase of the amount of change $\Delta A_{CC}$.

In the illustrated embodiments, the target-input-speed setting portion 82 is arranged to set the first transient target input speed $N_{IN}^{*}{}_{P1}$ on the basis of the vehicle condition and according to the speed-ratio control map shown in FIG. 7 by way of example. The target-input-speed setting portion 82 may be arranged to set the first transient target input speed $N_{IN}^{*}{}_{P1}$ on the basis of the basic or final input shaft speed $N_{IN}^{*}{}_{C}$ and an initial actual input shaft speed $N_{IN0}$ in an initial portion of the rapid shifting period, for example, at the moment of determination by the acceleration-requirement determining portion 90 that the vehicle acceleration is required by the vehicle operator. For instance, the first transient target input speed $N_{IN}^{*}{}_{P1}$ is obtained as a sum $(N_{IN0}+K \cdot \Delta N_{IN0})$ of the initial actual input shaft speed $N_{IN0}$ and a predetermined portion $(K \cdot \Delta N_{IN0})$ of a speed difference $\Delta N_{IN0}$ $(=N_{IN}^{*}{}_{C}-N_{IN0})$ between the final target value $N_{IN}^{*}{}_{C}$ and the initial actual input shaft speed $N_{IN0}$, wherein "K" is a predetermined ratio).

The input shaft speed $N_{IN}$, and the related parameters such as the target input speed $N_{IN}^{*}$, final or basic target input speed $N_{IN}^{*}{}_{C}$ and transient target input speed $N_{IN}^{*}{}_{P}$, which are used in the illustrated embodiments may be replaced by the engine speed $N_{E}$ and the related parameters such as a target engine speed $N_{E}^{*}$, or by the turbine speed $N_{T}$ and the related parameters such as a target turbine speed $N_{T}^{*}$.

In the illustrated embodiments, the vehicular drive system 10 includes a fluid-operated power transmitting device in the form of the torque converter 14 which is provided with the lock-up clutch 26. However, the power transmitting device need not be provided with the lock-up clutch 26. Further, the torque converter 14 may be replaced by a fluid coupling or any other type of fluid-operated power transmitting device which does not have a torque amplifying function.

It is to be understood that the present invention may be embodied with various other changes, modifications and improvements, which may occur to those skilled in the art, without departing from the spirit and scope of the present invention defined in the appended claims.

What is claimed is:

1. A speed-ratio control apparatus for controlling a speed ratio of a continuously variable transmission disposed in a power transmitting path between a drive power source and a drive wheel of a vehicle, such that an actual input speed of said continuously variable transmission coincides with a target input speed set on the basis of a running condition of the vehicle, said speed-ratio control apparatus comprising:

an acceleration-requirement determining portion operable, on the basis of a vehicle accelerating member, to determine whether non-rapid acceleration of the vehicle is required by an operator of the vehicle, and whether rapid acceleration of the vehicle is required by the operator; and a target-input-speed setting portion operable, upon determination by said acceleration-requirement determining portion that said non-rapid acceleration of the vehicle is required by the operator, to (i) implement an instantaneous stepping increase of said target input speed to a first transient target input speed which is higher than said actual input speed, (ii) hold said target input speed at said first transient target input speed in a first portion of a rapid shifting period, (iii) instantaneously reduce, at the end of said first portion of the rapid shifting period, said target input speed to an initial value of a second transient target input speed which initial value is close to said actual input speed and lower than said first transient target input speed, and (iv) gradually increase, in a second portion of the rapid shifting period following said first portion, the target input speed back toward said first transient target input speed, and upon determination by said acceleration-requirement determining portion that said rapid acceleration of the vehicle is required by the operator, said target-input-speed setting portion holding the target input speed at said first transient target input speed during said rapid shifting period, without setting at said second transient target input speed.

2. The speed-ratio control apparatus according to claim 1, wherein said target-input-speed setting portion gradually increases said second transient target input speed toward said first transient target input speed along a curve of a first-order time lag.

3. The speed-ratio control apparatus according to claim 2, wherein said second transient target input speed $N_{IN}^{*}{}_{P2}$ defined by said curve of the first-order time lag is represented by an equation $N_{IN}^{*}{}_{P2}(t)=1-e^{-t/T}$, wherein "T" is a time constant which decreases with an increase of a rate of increase of an amount of operation of said vehicle accelerating member.

4. The speed-ratio control apparatus according to claim 1, wherein said target-input-speed setting portion determines said first transient target input speed on the basis of an amount of operation of said vehicle accelerating member and a running speed of the vehicle.

5. The speed-ratio control apparatus according to claim 1, wherein a length of said first portion of said rapid shifting period is determined on the basis of a rate of increase of an amount of operation of said vehicle accelerating member.

6. The speed-ratio control apparatus according to claim 1, wherein said acceleration-requirement determining portion determines that said rapid acceleration of the vehicle is required by the operator, if an amount of operation of said vehicle accelerating member is not smaller than a predetermined threshold or if a rate of increase of the amount of operation of said vehicle accelerating member is not lower than a predetermined threshold.

7. The speed-ratio control apparatus according to claim 1, wherein said acceleration-requirement determining portion determines that said rapid acceleration of the vehicle is required by the operator, if an amount of operation of said vehicle accelerating member is not smaller than a predetermined threshold and if a rate of increase of the amount of operation of said vehicle accelerating member is not lower than a predetermined threshold.

8. The speed-ratio control apparatus according to claim 1, wherein said acceleration-requirement determining portion determines a requirement for said non-rapid acceleration of the vehicle and a requirement for said rapid acceleration of the vehicle, on the basis of at least one of: an amount of operation of an accelerator pedal provided as said vehicle accelerating member; an angle of opening of a throttle valve provided for said drive power source and controlled by said vehicle accelerating member; a rate of change of the amount of operation of said accelerator pedal; a rate of change of the angle of opening of said throttle valve; an amount of injection of a fuel into an intake pipe or cylinders of an engine provided as said drive power source; and a quantity of intake air introduced into said intake pipe.

9. The speed-ratio control apparatus according to claim 1, wherein said continuously variable transmission is a belt-and-pulley type continuously variable transmission including a pair of variable-diameter pulleys effective widths of which are variable, and a transmission belt connecting said pair of variable-diameter pulleys.

10. The speed-ratio control apparatus according to claim 1, wherein said drive power source includes an internal combustion engine.

* * * * *